(12) United States Patent
Kawakami et al.

(10) Patent No.: US 10,180,575 B2
(45) Date of Patent: Jan. 15, 2019

(54) IMAGE DISPLAY APPARATUS

(71) Applicants: HONDA MOTOR CO., LTD., Tokyo (JP); TOHOKU UNIVERSITY, Sendai-shi, Miyagi (JP)

(72) Inventors: Tohru Kawakami, Sendai (JP); Mutsumi Sasai, Sendai (JP); Yoshito Suzuki, Sendai (JP); Toshiyuki Araki, Sendai (JP); Masaru Ohira, Sakura (JP)

(73) Assignees: HONDA MOTOR CO., LTD., Tokyo (JP); TOHOKU UNIVERSITY, Sendai-shi (JP)

( * ) Notice: Subject to any disclaimer, the term of this patent is extended or adjusted under 35 U.S.C. 154(b) by 258 days.

(21) Appl. No.: 15/335,021

(22) Filed: Oct. 26, 2016

(65) Prior Publication Data

US 2017/0123212 A1 May 4, 2017

(30) Foreign Application Priority Data

Oct. 30, 2015 (JP) .................................. 2015-215120

(51) Int. Cl.
*G02B 27/01* (2006.01)
*G02B 13/16* (2006.01)
(Continued)

(52) U.S. Cl.
CPC ........... *G02B 27/0172* (2013.01); *G02B 5/02* (2013.01); *G02B 13/16* (2013.01);
(Continued)

(58) Field of Classification Search
CPC .... G02B 27/01; G02B 13/16; G02B 2027/01; G03B 21/28; B60K 35/00
See application file for complete search history.

(56) References Cited

U.S. PATENT DOCUMENTS

| 4,099,841 | A | * | 7/1978 | Ellis | .................... | G02B 27/0101 |
| | | | | | | 345/7 |
| 2002/0012173 | A1 | * | 1/2002 | Aoki | .................. | G02B 27/0101 |
| | | | | | | 359/630 |
| 2011/0199581 | A1 | | 8/2011 | Jhang et al. | | |

FOREIGN PATENT DOCUMENTS

| CN | 103091960 A | 5/2013 |
| JP | 63-158428 U1 | 10/1988 |
| | (Continued) | |

OTHER PUBLICATIONS

Office Action dated Apr. 19, 2018, issued in counterpart Chinese Application No. 201610959790.5, with English translation. (15 pages).

*Primary Examiner* — Toan Ton
*Assistant Examiner* — Danell L Owens
(74) *Attorney, Agent, or Firm* — Westerman, Hattori, Daniels & Adrian, LLP

(57) ABSTRACT

An image display apparatus includes a projection unit configured to project an image and a plurality of concave reflectors in which contact surfaces with optical axes of the concave reflectors with respect to the optical axis of the projection unit are disposed at different angles from one another. A first concave reflector of the plurality of concave reflectors reflects at least a portion of an image projected by the projection unit to form a first image based on the image. A second concave reflector of the plurality of concave reflectors transmits a portion of an image projected by the projection unit and reflects a portion of the image to form a second image based on the image.

19 Claims, 20 Drawing Sheets

(51) Int. Cl.
*G03B 21/28* (2006.01)
*G02B 5/02* (2006.01)
(52) U.S. Cl.
CPC ..... *G02B 27/0101* (2013.01); *G02B 27/0176* (2013.01); *G03B 21/28* (2013.01); *G02B 2027/013* (2013.01); *G02B 2027/0118* (2013.01); *G02B 2027/0123* (2013.01); *G02B 2027/0159* (2013.01)

(56) References Cited

FOREIGN PATENT DOCUMENTS

| | | | |
|---|---|---|---|
| JP | 2010-256867 | A | 11/2010 |
| JP | 2011-180177 | A | 9/2011 |
| WO | 2014/155590 | A1 | 10/2014 |

\* cited by examiner

IMAGE DISPLAY APPARATUS

CROSS REFERENCE TO RELATED APPLICATIONS

Priority is claimed on Japanese Patent Application No. 2015-215120, filed Oct. 30, 2015, the content of which is incorporated herein by reference.

BACKGROUND OF THE INVENTION

Field of the Invention

The present invention relates to an image display apparatus.

Description of Related Art

A head-up display (HUD) for displaying driving information on a windshield of a vehicle by superimposing the driving information on a driver's field of view has been developed. The driving information is, for example, information on a speed and car navigation. In a conventional HUD, vehicle information is invisible to both a driver and a fellow passenger sitting in a passenger seat due to a narrow viewing angle.

Thus, a display apparatus that allows a driver and a fellow passenger to view driving information by placing a half-mirror between a display body and a display unit to change an angle of a display surface on which an image is displayed has been proposed (for example, refer to Japanese Utility Model No. 63-158428 (hereinafter, Patent Document 1)). In addition, the display body is a fluorescent display tube or a liquid crystal panel, and driving information is displayed thereon. Also, the display unit is a semi-transparent mirror provided at an inner surface of a windshield of a vehicle, and a display light projected from the display body is projected on the display unit. With the technology described in Patent Document 1, a driver may view driving information that is transmitted through the half-mirror and displayed on the display unit, and a fellow passenger may view the driving information reflected by the half-mirror.

In addition, a display apparatus that projects driving information from a projector to a holographic optical system by placing the holographic optical system on a windshield has been proposed (for example, refer to Japanese Unexamined Patent Application, First Publication No. 2011-180177 (hereinafter, Patent Document 2)). With the display apparatus described in Patent Document 2, a driver and a fellow passenger may view driving information when a projected image of the driving information is diffracted at two angles by an interference pattern pre-recorded in two or more layers of the holographic optical system. With the technology described in Patent Document 2, a driver may view a first diffracted light due to a first layer of a holographic optical element, and a fellow passenger may view a second diffracted light due to a second layer of the holographic optical element.

SUMMARY OF THE INVENTION

However, since the half-mirror is used in the technology described in Patent Document 1, brightness of an image visible to a driver and brightness of an image visible to a fellow passenger are different in some cases.

Also, since the second diffracted light is transmitted through the first layer and then obtained by the second layer of the holographic optical element in the technology described in Patent Document 2, brightness of an image visible from the first diffracted light and brightness of an image visible from the second diffracted light are different in some cases.

An aspect of the present invention is devised in consideration of the problem above, and an object thereof is to provide an image display apparatus capable of displaying display images that are more similar in brightness from one another to several people.

To achieve the object above, the present invention employs the following aspects.

(1) An image display apparatus according to an aspect of the present invention is wherein: a projection image of a projector is formed as a first image of size $d_0$ on an angularly uniform diffusion film or on a normal diffusion film; a condensing lens with a focal length $f_0$ is installed to be adhered to the diffusion film; one or a plurality of image-forming lenses with a lens pupil diameter $d_1$ at a synthetic focal length $f_1$: $((1/a)+(1/b)=(1/f_1))$ is installed at a distance of approximately $f_0=a$ from the condensing lens; an aerial real image of the first image is formed at a distance of approximately b from a main plane of the image-forming lens with a magnification factor of approximately b/a by the image-forming lens; a plurality of transparent concave reflectors each with a focal length $f_2$: $((1/b)+(1/c)=(1/f_2))$ and reflectance of about 4% to 50% is stacked at intervals at which the plurality of transparent concave reflectors are able to come into contact with one another by changing angles formed between one another by approximately $\theta1$: $(\theta1 \geq (\frac{1}{2}) \tan^{-1}(d_1/b))$ near the aerial image having a size of approximately $(b/a)d_0$; an aerial image of a lens pupil of the image-forming lens with a size $(c/b)d_1$, which has a magnification factor of approximately c/b, is formed at a distance of approximately c in a direction of a main reflection ray of each of the transparent concave reflectors; and an infinite pentagonal viewing area is formed when $(c/b)d_1 \geq (b/a)d_0$ in front of and behind the aerial image of the lens pupil and a diamond-shaped viewing area is formed when $(c/b)d_1 < (b/a)d_0$ in front of and behind the aerial image of the lens pupil.

(2) An image display apparatus according to an aspect of the present invention is wherein: a projection image of a projector is formed as a first image of size $d_0$ on an angularly uniform diffusion film or on a normal diffusion film; a condensing lens with a focal length $f_0$ is installed to be adhered to the diffusion film; one or a plurality of image-forming lenses with a lens pupil diameter $d_1$ at a synthetic focal length $f_1$: $((1/a)+(1/b)=(1/f_1))$ is installed at a distance of approximately $f_0=a$ from the condensing lens; an aerial real image of the first image is formed at a distance of approximately b from a main plane of the image-forming lens with a magnification factor of approximately b/a by the image-forming lens; a plurality of transparent concave reflectors each with a focal length $f_2$: $((1/c)+(1/d)=(1/f_2))$ and reflectance of about 4% to 50% is stacked at intervals at which the plurality of transparent concave reflectors are able to come into contact with one another by changing angles formed between one another by approximately $\theta_1$: $(\theta_1 \geq (\frac{1}{2}) \tan^{-1}(d_1/b+c))$ at a distance of approximately c: $(c \leq f_2)$ from the aerial image having a size of approximately $(b/a)d_0$; a virtual image of the first image in a size $(bd/ac)d_0$ with a magnification factor bd/ac is formed at a distance of approximately d in the back direction of each of the transparent concave reflectors; an aerial image of a lens pupil of the image-forming lens in a size $(e/(b+c))d_1$, which has a magnification factor of approximately $e/(b+c)$, is formed at a distance of approximately e in a direction of a main reflection ray of each of the transparent concave reflectors; and an infinite pentagonal viewing area is formed when $(e/(b+c))d_1 \geq (bd/ac)d_0$ in front of and behind the aerial image of the lens pupil and a diamond-shaped viewing area is formed when $(e/(b+c))d_1 < (bd/ac)d_0$ in front of and behind the aerial image of the lens pupil.

(3) According to an aspect of the present invention, an image display apparatus includes a projection unit configured to project an image and a plurality of concave reflectors in which contact surfaces with optical axes of the concave reflectors with respect to the optical axis of the projection unit are disposed at different angles from one another. A first concave reflector of the plurality of concave reflectors reflects at least a portion of an image projected by the projection unit to form a first image based on the image. A second concave reflector of the plurality of concave reflectors transmits a portion of an image projected by the projection unit and reflects a portion of the image to form a second image based on the image.

In addition, the contact surface with the optical axis of each of the concave reflectors with respect to the optical axis of the projection unit is a surface including the optical axis of each of the concave reflectors or a surface including a line perpendicular to the optical axis of each of the concave reflectors, coming into contact with a surface including a line perpendicular to the optical axis of the projection unit.

(4) According to the aspect (3), the projection unit may include an image-forming lens configured to form the image, any one of the first concave reflector, the second concave reflector, and a position between the first concave reflector and the second concave reflector may be disposed at a position of a real image formed by the image-forming lens, the first image may be formed on the basis of one of a real image, a virtual image, and an aerial image formed by the first concave reflector, the second image may be formed on the basis of one of a real image, a virtual image, and an aerial image formed by the second concave reflector, and a type of one of the real image, the virtual image, and the aerial image formed by the second concave reflector may be different from a type of one of the real image, the virtual image, and the aerial image formed by the first concave reflector.

(5) According to the aspect (3), the projection unit may include an image-forming lens configured to form the image, the second concave reflector may be disposed such that a distance from the image-forming lens is larger than a distance from a real image formed by the image-forming lens, the first image may be an image based on a virtual image, and the second image may be an image based on a virtual image.

(6) According to the aspect (4), a diffusion angle of each of the first image and the second image may be within an angle calculated on the basis of a distance from an aerial image corresponding to each of the plurality of concave reflectors.

(7) According to the aspect (4), the projection unit may include a diffusion film configured to diffuse rays from the projected image and a condensing lens configured to condense the rays diffused by the diffusion film. The image-forming lens may form an image of rays condensed by the condensing lens, a size of an image projected by the projection unit may be $d_0$, a lens pupil diameter of the image-forming lens may be $d_1$, a distance between the condensing lens and the image-forming lens may be a, a distance in the optical axis direction between the image-forming lens and the second concave reflector may be b, the focal length $f_1$ of the image-forming lens may satisfy the relational expression $\{(1/a)+(1/b)=(1/f_1)\}$, the first image and the second image may be formed at a distance c from the real image in the optical axis direction, a focal length $f_2$ of each of the first concave reflector and the second concave reflector may satisfy the relational expression $\{(1/b)30\ (1/c)=(1/f_2)\}$, and a size of each of the first image and the second image may be $(c/b)d_1$.

(8) According to the aspect (7), an angle $\theta_1$ between a contact surface with the optical axis of the first concave reflector and a contact surface with the optical axis of the second concave reflector may satisfy the relational expression $\{|\theta_1| \geq (\frac{1}{2})\tan^{-1}(d_1/b)\}$.

(9) According to the aspect (5) or (8), an infinite pentagonal viewing area may be formed when $\{(c/b)d_1 \geq (b/a)d_0\}$ and a hexagonal viewing area may be formed when $\{(c/b)d_1 < (b/a)d_0\}$ in front of and behind the first image and the second image.

(10) According to the aspect (5), the projection unit may include a diffusion film configured to diffuse rays from the projected image and a condensing lens configured to condense the rays diffused by the diffusion film. The image-forming lens may form an image of rays condensed by the condensing lens, a lens pupil diameter of the condensing lens may be $d_0$, a lens pupil diameter of the image-forming lens may be $d_1$, a distance between the condensing lens and the image-forming lens may be a, a distance in the optical axis direction between the image-forming lens and a real image formed by the image-forming lens may be b, a distance in the optical axis direction between any one of the plurality of concave reflectors and the real image or a distance in the optical axis direction between a position between the plurality of concave reflectors and the real image may be e, the focal length $f_1$ of the image-forming lens may satisfy the relational expression $\{(1/a)+(1/b)=(1/f_1)\}$, the first image and the second image may be formed at a distance h from any one of the plurality of concave reflectors or a distance h from a position between the plurality of concave reflectors in traveling directions of reflected rays from the first concave reflector and the second concave reflector, respectively, a distance between a virtual image due to the second concave reflector and the second concave reflector may be g, a focal length $f_2$ of each of the first concave reflector and the second concave reflector may satisfy the relational expression $[\{(1/e)-(1/g)\}=(1/f_2)]$ and satisfy the relational expression $[\{1/(b+e)\}+(1/h)=(1/f_2)]$, and a size of each of the first image and the second image may be $\{h/(b+e)\}d_1$.

(11) According to the aspect (10), an angle $\theta_1$ between a contact surface with the optical axis of the first concave reflector and a contact surface with the optical axis of the second concave reflector may satisfy the relational expression $\{|\theta^1| \leq (\frac{1}{2})\tan^{-1}(d_1/(b+e))\}$.

(12) According to the aspect (10) or (11), an infinite pentagonal viewing area may be formed when $\{h/(b+e)\}d_1 \geq \{(bg/ae)d_0\}$ and a hexagonal viewing area may be formed when $\{h/(b+e)\}d_1 < \{(bg/ae)d_0\}$ in front of and behind the first image and the second image.

(13) According to any one of the aspects (3) to (11), the number of the plurality of concave reflectors may be three or more, a third concave reflector of the plurality of concave reflectors may be disposed between the projection unit and the first concave reflector and reflect a portion of an image projected by the projection unit to form a third aerial image based on the image, and the second concave reflector may be disposed between the first concave reflector and the third concave reflector.

(14) According to any one of the aspects (3) to (13), the number of the plurality of concave reflectors may be three or more, a third concave reflector of the plurality of concave reflectors may be disposed between the projection unit and the first concave reflector and reflect a portion of an image projected by the projection unit to form a third aerial image based on the image, the second concave reflector may be disposed between the first concave reflector and the third concave reflector, and a first difference between a first angle of a contact surface with the optical axis of the first concave reflector with respect to a line perpendicular to the optical axis and a second angle of a contact surface with the optical axis of the second concave reflector with respect to a line perpendicular to the optical axis may be different from a second difference between the second angle and a third angle of a contact surface with the optical axis of the third concave reflector with respect to a line perpendicular to the optical axis.

(15) According to any one of the aspects (3) to (14), the focal lengths of the plurality of concave reflectors may have the same value, $f_2$.

(16) According to any one of the aspects (3) to (14), the focal lengths of the plurality of concave reflectors may have different values from one another.

(17) According to any one of the aspects (3) to (16), at least one of a moth-eye structure film and an anti-reflection (AR) coating for preventing reflection may be provided at a surface or a back surface of the plurality of concave reflectors.

(18) According to any one of the aspects (3) to (17), a back surface of the first concave reflector may be black.

(19) According to any one of the aspects (3) to (18), the projection unit may include at least one of a projector or a combination of a liquid crystal panel and a lens.

According to the aspect (1), a range in which a display image due to a real image is visible can correspond to several people, and the display image can be brightly displayed with substantially the same brightness to the several people. Also, according to the aspect (1), an image display apparatus that hardly propagates optical energy to positions other than positions of several predetermined observers, thereby having high optical utilization efficiency, high transmittance, and high transparency, can be provided.

According to the aspect (2), a range in which a display image due to a virtual image is visible can correspond to several people, and the display image can be brightly displayed with substantially the same brightness to the several people. In this way, according to the aspect (2), since all virtual images of a plurality of combiners are formed in the optical axis direction of the combiners, an observer can view the display image without adjusting a lens very much. Also, according to the aspect (2), an image display apparatus that hardly propagates optical energy to positions other than positions of several predetermined observers, thereby having high optical utilization efficiency, high transmittance, and high transparency, can be provided.

According to the aspects (3), (7), and (10), display images more similar in brightness compared to the related art can be displayed to several people.

According to the aspect (4), when n combiners are present, display images more similar in brightness compared to the related art can be provided to n observers, and an excellent characteristic in which optical energy is hardly propagated in directions other than directions of the n observers can be realized.

According to the aspect (5), since all virtual images of a plurality of combiners are formed in the optical axis direction of the combiners, an observer can view the display image without adjusting a lens very much.

According to the aspect (6), display images more similar in brightness compared to the related art can be displayed to several people.

According to the aspects (8) and (11), superimposition between a spatial-image-forming iris surface due to a first combiner and a spatial-image-forming iris surface due to a second combiner can be prevented. As a result, according to the aspects (8) and (11), two observers can view the same display image without superimposition between the display images.

According to the aspects (9) and (12), an infinite pentagonal viewing area or a hexagonal (diamond-shaped) viewing area can be formed depending on a range in the optical axis direction of an area desired to be viewed by an observer. When the infinite pentagonal viewing area is formed, a display image can be visible to a driver and a fellow passenger in a back seat of a vehicle, for example. In addition, when the hexagonal (diamond-shaped) viewing area is formed, a display image visible only to the driver and invisible to the fellow passenger in the back seat of the vehicle can be displayed, for example.

According to the aspect (13), even when three or more observers are present, images having the same size and substantially the same brightness can be provided to the three or more observers from the plurality of combiners.

According to the aspect (14), an angle at which an aerial image of a spatial-image-forming iris surface is formed and an interval in a direction perpendicular to the optical axis can be adjusted for each combiner depending on a position of a driver, a fellow passenger sitting in a passenger seat, or an observer in a back seat.

According to the aspect (15), images having the same size and substantially the same brightness can be provided to a driver and a fellow passenger sitting in substantially the same position in the optical axis direction from the plurality of combiners.

According to the aspect (16), distances from the image display apparatus to a position viewed by an observer can differ from one another.

According to the aspect (17), even when the thickness of the combiner is thick, occurrence of a double image due to back reflection can be reduced.

According to the aspect (18), contrast of a display image displayed by the combiner can be improved.

According to the aspect (19), when the projection unit includes a liquid crystal panel and a lamp optical system, an angularly and spatially uniform optical surface formed by the diffusion film is used as a backlight of the liquid crystal panel such that a diffusion film surface and a liquid crystal image display surface are detached. As a result, according to the aspect (19), scintillation of a display image surface is reduced, and the image quality is improved.

BRIEF DESCRIPTION OF THE DRAWINGS

FIG. 4 is a view in which FIGS. 1 to 3 are synthesized.

FIG. 12 is a view in which FIGS. 9 to 11 are synthesized.

FIG. 18 is a view in which FIGS. 15 to 17 are synthesized.

DETAILED DESCRIPTION OF THE INVENTION

Hereinafter, an embodiment of the present invention will be described with reference to the drawings. Also, in the following description, a head-up display (HUD) installed in a vehicle will be described as an example of an image display apparatus.

First Embodiment

Figure 1:
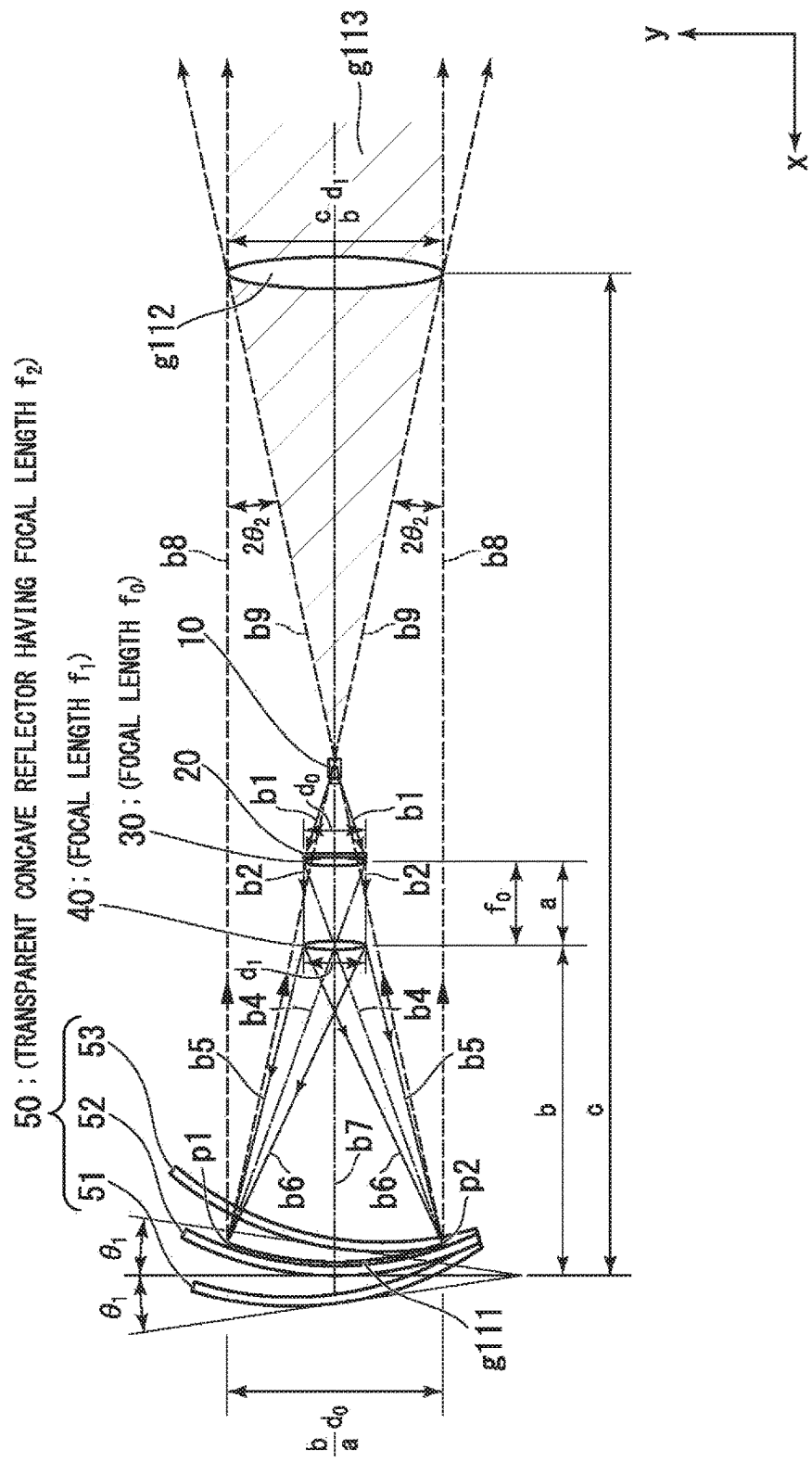
FIG. 1 is a view illustrating a constitution of an image display apparatus and a spatial-image-forming iris surface due to a real image of a first combiner according to a first embodiment.
Figure 2:
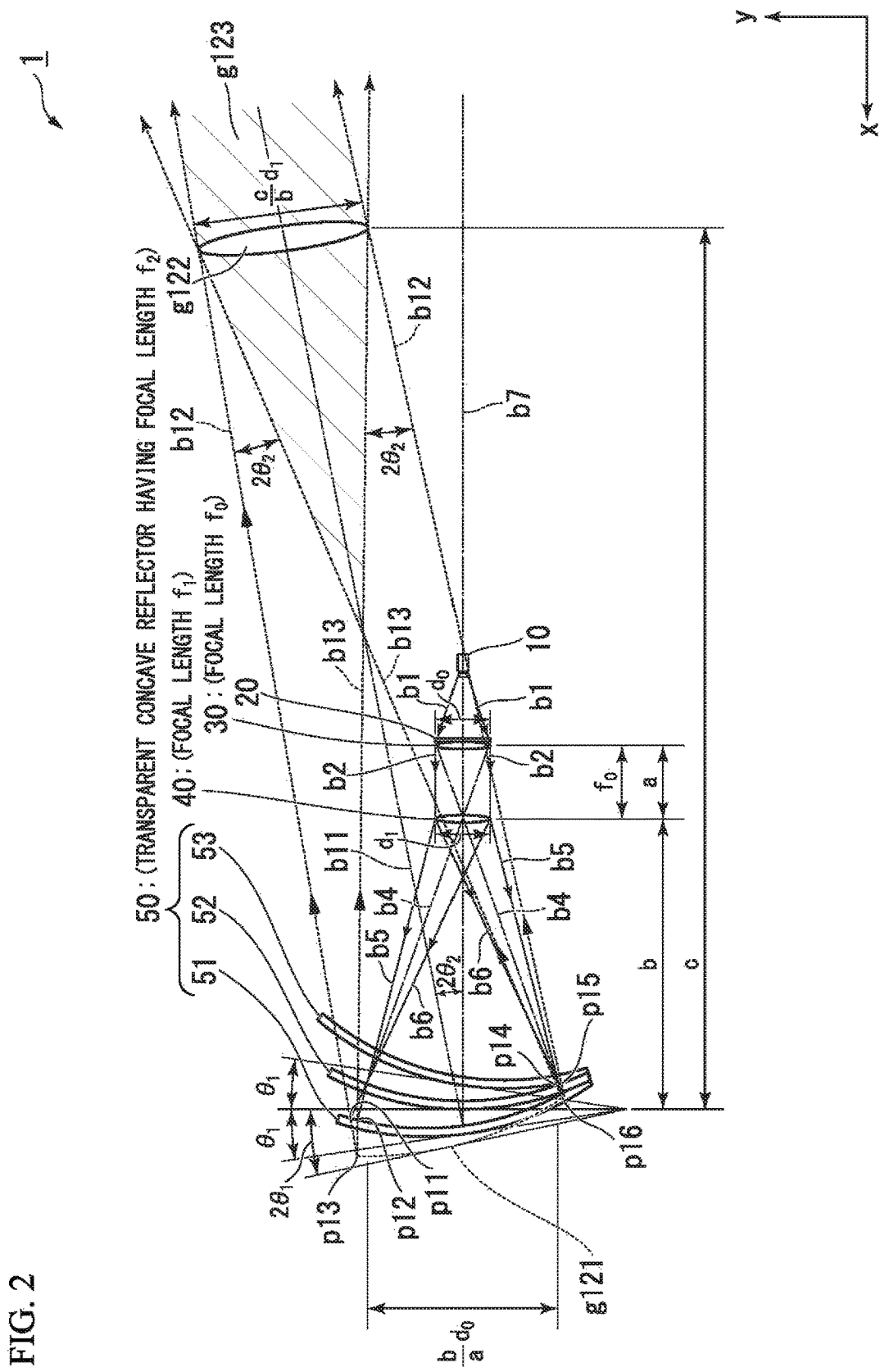
FIG. 2 is a view illustrating the constitution of the image display apparatus and a spatial-image-forming iris surface due to a virtual image of a second combiner according to the first embodiment.
Figure 3:
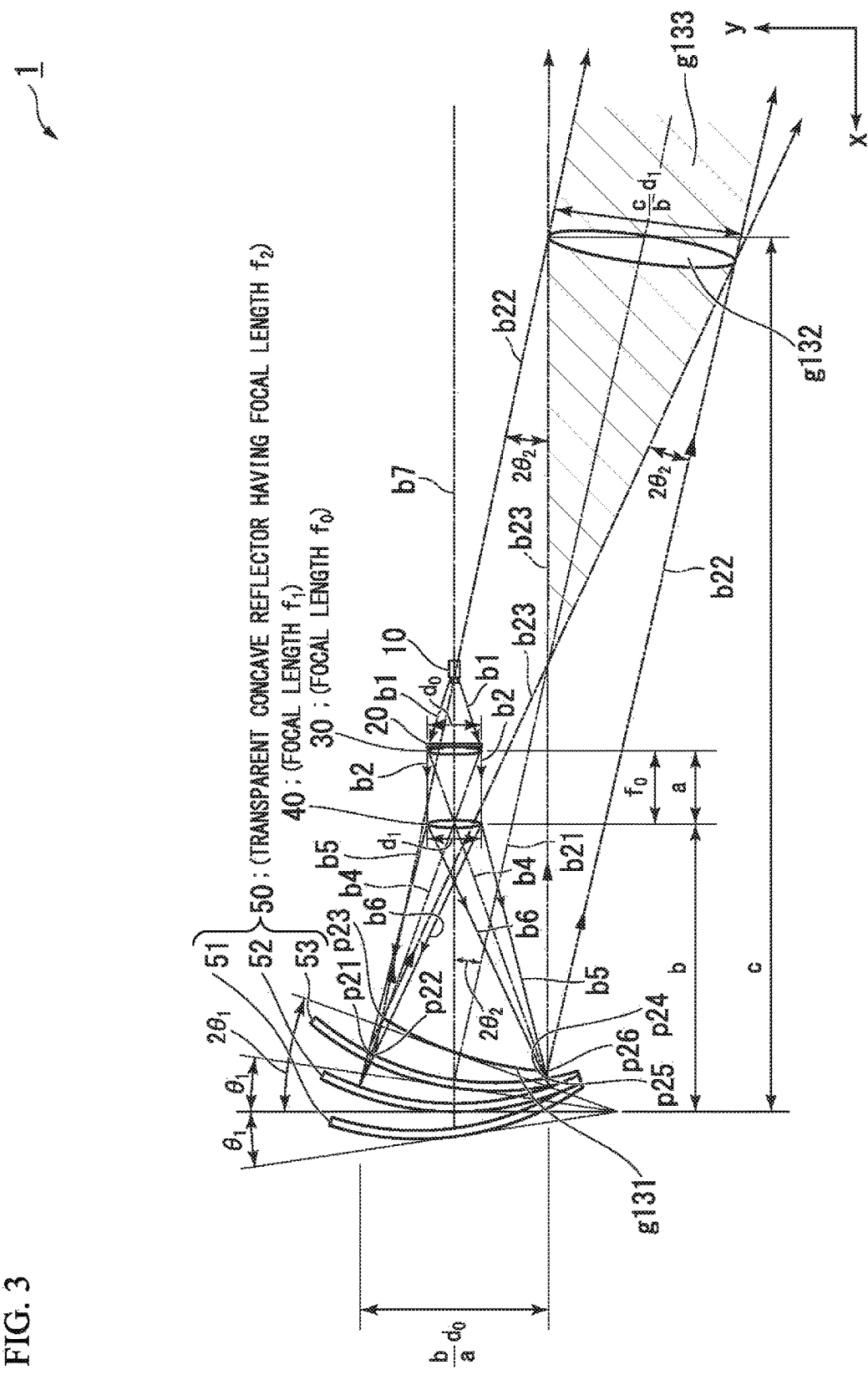
FIG. 3 is a view illustrating the constitution of the image display apparatus and a spatial-image-forming iris surface due to an aerial image of a third combiner according to the first embodiment.
Figure 4:
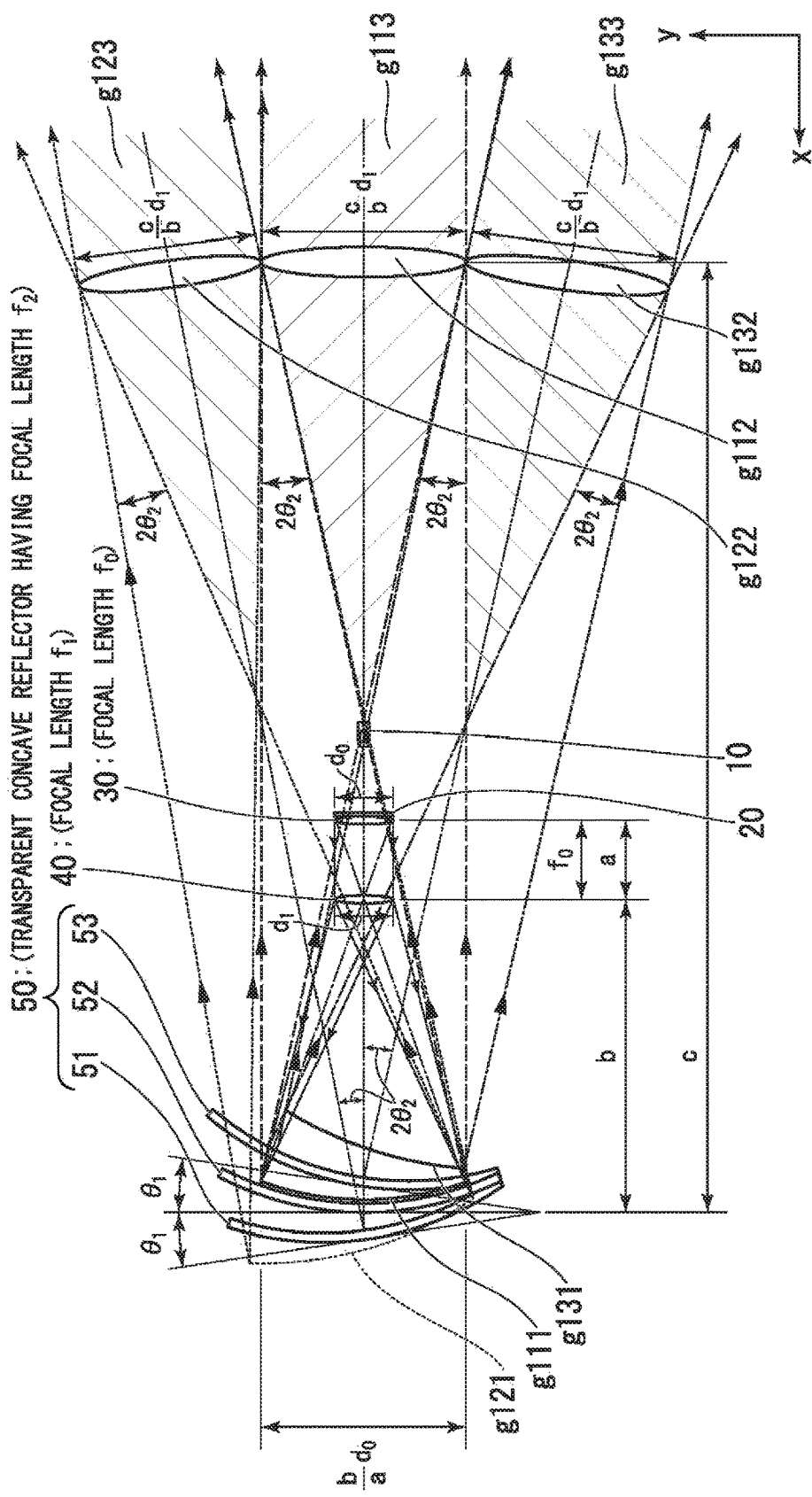

FIG. 1 is a view illustrating a constitution of an image display apparatus 1 and a spatial-image-forming iris surface g112 due to a real image g111 of a second combiner 52 according to the embodiment. FIG. 2 is a view illustrating the constitution of the image display apparatus 1 and a spatial-image-forming iris surface g122 due to a virtual image g121 of a first combiner 51 according to the embodiment. FIG. 3 is a view illustrating the constitution of the image display apparatus 1 and a spatial-image-forming iris surface g132 due to an aerial image g131 of a third combiner 53 according to the embodiment. FIG. 4 is a view in which FIGS. 1 to 3 are synthesized.

<Constitution of the Image Display Apparatus 1>

As illustrated in FIGS. 1 to 4, an image display apparatus 1 includes a projector 10 (projection unit), a diffusion film 20 (projection unit), a condensing lens 30 (projection unit), an image-forming lens 40 (projection unit), and multiple stacked combiners 50. Also, the multiple stacked combiners 50 include a first combiner 51 (first concave reflector), a second combiner 52 (second concave reflector), and a third combiner 53 (third concave reflector).

In FIGS. 1 to 4, a line b7 represents an optical axis of the projector 10. Also, in FIGS. 1 to 4, an optical axis (line b7) direction is an x-axis direction, and a direction perpendicular to the optical axis is a y-axis direction.

As illustrated in FIGS. 1 to 4, in the image display apparatus 1, the projector 10, the diffusion film 20, the condensing lens 30, the image-forming lens 40, the third combiner 53, the second combiner 52, and the first combiner 51 are disposed in that order in the optical axis direction of the projector 10. Also, light incident on a combiner from the projector 10 is referred to as incident rays, and light based on a real image, a virtual image, or an aerial image formed by the combiner is referred to as main rays.

The diffusion film 20 and the condensing lens 30 are disposed to be adhered to each other in the x-axis direction.

A main plane of the condensing lens 30 is disposed at a distance a from a main plane of the image-forming lens 40 in the x-axis direction. In addition, the distance a is a focal length $f_0$ of the condensing lens 30. Also, an optical axis of each of the condensing lens 30 and the image-forming lens 40 is disposed to be aligned with the optical axis (line b7) of the projector 10. In addition, a main plane of a lens is a surface coming into contact with a line perpendicular to the optical axis.

The image-forming lens 40 is disposed at a distance b from the second combiner 52 in the x-axis direction.

Lower ends of the first combiner 51, the second combiner 52, and the third combiner 53 are adhered to one another. A contact surface with an optical axis of the second combiner 52 forms an angle of approximately 0° with a line perpendicular to the optical axis and forms an angle of approximately 90° with the optical axis. A contact surface with an optical axis of the first combiner 51 forms an angle of $+\theta_1$ with the line perpendicular to the optical axis and forms an angle of approximately $90°+\theta_1$ with the optical axis. A contact surface with an optical axis of the third combiner 53 forms an angle of $-\theta_1$ with the line perpendicular to the optical axis and forms an angle of approximately $90°-\theta_1$ with the optical axis. In addition, according to an embodiment, a counterclockwise angle with respect to the optical axis is a positive angle, and a clockwise angle is a negative angle. In other words, a contact surface with a line perpendicular to the optical axis of the first combiner 51 is disposed with an angle of inclination of $+\theta_1$ with respect to a contact surface with a line perpendicular to the optical axis of the second combiner 52. Also, a contact surface with a line perpendicular to the optical axis of the third combiner 53 is disposed with an angle of inclination $-\theta_1$ with respect to the contact surface with the line perpendicular to the optical axis of the second combiner 52. In addition, the optical axis of each combiner is a symmetrical axis passing through a center of image formation of each combiner. Also, a contact surface with an optical axis of a concave reflector (combiner) with respect to the optical axis (line b7) of the projection unit (projector 10) is a surface including an optical axis of each combiner or a surface including a line perpendicular to the optical axis of each combiner, coming into contact with a surface including a line perpendicular to the optical axis (line b7) of the projector 10.

<Optical System of the Image Display Apparatus 1>

An image output device (not illustrated) is connected to the projector 10. The projector 10 projects an image output by the image output device to the diffusion film 20. A ray b1 is a ray of the image radiated from the projector 10. In addition, the image projected by the projector 10 is a spatially uniform image. Also, the image projected by the projector 10 is driving information such as speed information and car navigation information required for driving.

The diffusion film 20 is, for example, a diffused light control (DLC) film angularly uniform within ±15° (for example, refer to Japanese Unexamined Patent Application, First Publication No. 2006-171074). In addition, the DLC film is a diffusion film for realizing angularly uniform diffusion required to realize image formation on a spatial-image-forming iris surface that is spatially and angularly uniform. Thus, rays that are both spatially and angularly uniform are emitted from an output surface of the diffusion film 20. Also, the spatial-image-forming iris surface is a surface that is both spatially and angularly uniform and is a surface on which rays of entire image information are condensed only near both eyes of a user. An image projected from the projector 10 is formed on the diffusion film 20. The diffusion film 20 angularly uniformly diffuses the formed image. Thus, the image diffused from the diffusion film 20 is optically uniform both spatially and angularly. In addition, the diffusion film 20 may also be a diffusion film other than the DLC film such as orthogonally stacked lenticular lens sheets using a lenticular lens having a very small pitch.

The focal length of the condensing lens 30 is $f_0$, and the size of the lens pupil of the condensing lens 30 is $d_0$. A ray (ray b2) of an image diffused by the diffusion film 20 is deflected into the lens pupil of the image-forming lens 40 and incident on the condensing lens 30. Here, since a distance between main planes of the condensing lens 30 and the image-forming lens 40 is $a=f_0$, almost all rays are deflected into the lens pupil of the image-forming lens 40. In this way, optical utilization efficiency is improved, thereby allowing a bright image to be formed.

The lens pupil diameter of the image-forming lens 40 is $d_1$, and the focal length of the image-forming lens 40 is $f_1$. In addition, the image-forming lens 40 may be a combined lens formed of a plurality of lenses. The image-forming lens 40 forms an image of the ray (ray b2) incident from the condensing lens 30 and radiates the formed image (rays b5 and b6).

In FIGS. 1 to 4, a line b4 is a central line of each of the ray b5 and the ray b6. In addition, the focal length $f_1$ of the image-forming lens 40 satisfies the relationship of the following Formula (1).

$$\frac{1}{a}+\frac{1}{b}=\frac{1}{f_1} \qquad (1)$$

Each of the first combiner 51, the second combiner 52, and the third combiner 53 is a transparent concave reflector formed of transparent acryl or transparent glass. In addition, each of the first combiner 51, the second combiner 52, and the third combiner 53 has a concave surface facing the projector 10. Since the first combiner 51, the second combiner 52, and the third combiner 53 are transparent concave reflectors, a background present in a traveling direction of an incident ray with respect to the first combiner 51 is visible to the user through the first combiner 51, the second combiner 52, and the third combiner 53.

Reflectance R of each of the first combiner 51, the second combiner 52, and the third combiner 53 is, for example, 4 to 8%, the focal length thereof is $f_2$, and transmittance T is, for example, 92 to 96%. When, for example, the reflectance of each combiner is 4% and the transmittance thereof is 96%, the third combiner 53 reflects 4% of light and transmits 96% of light.

In addition, light that has been transmitted through the third combiner 53 is incident on the second combiner 52.

The intensity of the light incident on the second combiner 52 is 0.96 times (96% of) the intensity of the light incident on the third combiner 53, and the intensity of the light transmitted through the second combiner 52 is approximately 0.92 times ($=0.96^2$) the intensity of the light incident on the third combiner 53. The second combiner 52 reflects 4% of light and transmits 96% of light.

In addition, light that has been transmitted through the third combiner 53 and the second combiner 52 is incident on the first combiner 51. The intensity of the light incident on the first combiner 51 is approximately 0.92 times ($=0.96^2$) the intensity of the light incident on the third combiner 53, and the intensity of the light transmitted through the first combiner 51 is approximately 0.88 times ($=0.96^3$) the intensity of the light incident on the third combiner 53. The first combiner 51 reflects 4% of light and transmits 96% of light.

In addition, the reflectance R of each of the first combiner 51, the second combiner 52, and the third combiner 53 is preferably 4% to 50%.

In FIGS. 1 to 4, an example of forming an image radiated by the image-forming lens 40 on a surface of the second combiner 52 is shown. In addition, a direction of a concave surface in the x-axis direction of each of the first combiner 51, the second combiner 52, and the third combiner 53 is referred to as a traveling direction of a main ray or a front direction, and a convex surface side in the opposite direction in the x-axis direction is referred to as a traveling direction of an incident ray or a back direction.

Also, the focal length $f_2$ of each of the first combiner 51, the second combiner 52, and the third combiner 53 satisfies the relationship of the following Formula (2).

$$\frac{1}{b}+\frac{1}{c}=\frac{1}{f_2} \qquad (2)$$

In the example illustrated in FIG. 1, the real image g111 (also referred to as an aerial real image of the first image) is an image formed on the surface of the second combiner 52. The real image g111 has an upper end p1 and a lower end p2. Since the magnification factor of the real image g111 is b/a, the size of the real image g111 in the y-axis direction is $(b/a)d_0$ from the upper end p1 to the lower end p2. In addition, image surface curvature of the real image g111 corresponds to the second combiner 52.

The first combiner 51 reflects an image based on the real image g111 in the optical axis direction of the projector 10. In FIG. 1, a ray b8 and a ray b9 are main rays. In addition, in FIGS. 1 to 4, an angle $\theta_2$ is $\tan^{-1}\{(b/2ac)d_0\}$.

As illustrated in FIG. 2, the ray b5 and the ray b6 that have been transmitted through the third combiner 53 and the second combiner 52 are incident on the first combiner 51, and images of focal points of the ray b5 and the ray b6 are formed at points p11, p12, p14, and p15 on the first combiner 51.

Also, the first combiner 51 forms a virtual image g121 inclined at an angle of $+2\theta_1$ with respect to the line perpendicular to the optical axis in a traveling direction of an incident ray with respect to the second combiner 52. The size of the virtual image g121 in the y-axis direction is $(b/a)d_0$. Images of rays formed at the points p11 and p12 on the first combiner 51 are formed at a point p13 on the virtual image g121, and images of rays formed at the points p14 and p15 on the first combiner 51 are formed at a point p16 on the virtual image g121.

The first combiner 51 reflects an image based on the virtual image g121 upward at an angle of $+2\theta_1$ with respect to the optical axis of the projector 10. In FIG. 2, a ray b12 and a ray b13 are main rays, and a line b11 is a central line of each of the ray b12 and the ray b13.

As illustrated in FIG. 3, the ray b5 and the ray b6 projected from the projector 10 are incident on the third combiner 53, and images of focal points of the ray b5 and the ray b6 are formed at points p21, p22, p24, and p25 on the third combiner 53.

Also, the third combiner 53 forms an aerial image g131 inclined at an angle of $-\theta_1$ with respect to the line perpendicular to the optical axis in a traveling direction of a main ray with respect to the second combiner 52. The size of the aerial image g131 in the y-axis direction is $(b/a)d_0$. Images of rays formed at the points p21 and p22 on the third combiner 53 are formed at a point p23 on the aerial image g131, and images of rays formed at the points p24 and p25 on the third combiner 53 are formed at a point p26 on the aerial image g131.

The third combiner 53 reflects the aerial image g131 downward at an angle of $-2\theta_1$ with respect to the optical axis (line b7) of the projector 10. In FIG. 3, a ray b22 and a ray b23 are main rays, and a line b21 is a central line of each of the ray b22 and the ray b23.

<Spatial-Image-Forming Iris Surface>

Next, an aerial image of a lens pupil of the image-forming lens 40 due to each of the first combiner 51, the second combiner 52, and the third combiner 53 will be described.

First, an aerial image of the lens pupil of the image-forming lens 40 due to the second combiner 52 will be described.

As illustrated in FIG. 1, since the focal length $f_2$ of the second combiner 52 satisfies the relationship of Formula (2), the main ray b8 and the main ray b9 of the real image g111 due to the second combiner 52 forms a magnified image of the lens pupil of the image-forming lens 40 in the air at a distance c in the x-axis direction from a contact surface with a line perpendicular to the optical axis of the second combiner 52 or a contact surface with the optical axis and the real image. According to an embodiment, the magnified aerial image of the lens pupil of the image-forming lens 40 is referred to as a spatial-image-forming iris surface. The size of the spatial-image-forming iris surface in the y-axis direction becomes $(c/b)d_1$ since the lens pupil diameter $d_1$ of the image-forming lens is magnified by a factor of c/b.

In the lens pupil of the image-forming lens 40, light containing all pixel information of an image changes position information to angle information, and the position information and the angle information are mixed. Thus, when a human eye is present within the spatial-image-forming iris surface in a conjugate relationship, since the lens of the human eye converts the angle information to the position information and forms a display image on the retina, an image due to the image display apparatus 1 is visible. Also, as described above, since each of the first combiner 51 to the third combiner 53 is semi-transparent, a background present in a traveling direction of an incident ray is visible through the first combiner 51 to the third combiner 53.

Also, as described above, since an image surface formed on the diffusion film 20 is uniform both spatially and angularly, the lens pupil of the image-forming lens 40 in which the angular information is changed to the position information also becomes an optical surface that is uniform both spatially and angularly. Consequently, according to the embodiment, the spatial-image-forming iris surface is a surface that is uniform both spatially and angularly. As a result, even when an observer moves within a viewing area of a spatial-image-forming iris surface indicated by an area g113 in FIG. 1, optical intensity remains unchanged, and a spatially uniform, clean image is visible. As illustrated in FIG. 1, the area g113 is formed between a spatial-image-forming iris surface g112 and the diffusion film 20, i.e. forward in the x-axis direction (traveling direction of an incident ray) with respect to the spatial-image-forming iris surface g112 and rearward in the x-axis direction (traveling directions of the main ray b8 and the main ray b9) with respect to the spatial-image-forming iris surface g112. In addition, in the embodiment, an area in which the optical intensity remains unchanged and a spatially uniform, clean image is visible even when an observer moves is referred to as a viewing area.

When the relationship between the size $(c/b)d_1$ of the spatial-image-forming iris surface g112 and the size $(b/a)d_0$ of the display image of the image display apparatus 1 satisfies the following Formula (3), the main ray b8 and the main ray b9 become parallel, and the shape of the viewing area becomes an infinite pentagonal shape (an infinite pentagonal shape).

$$\frac{c}{b}d_1 \geq \frac{b}{a}d_0 \quad (3)$$

In addition, the infinite pentagonal shape is a pentagonal shape in which a base of the pentagonal shape is disposed from the position of the spatial-image-forming iris surface g112 to an infinite position. In addition, FIG. 1 shows an example in which the shape of the viewing area is the infinite pentagonal shape.

Also, when the size $(c/b)d_1$ of the spatial-image-forming iris surface g112 and the size $(b/a)d_0$ of the display image of the image display apparatus 1 satisfies the following Formula (4), the main ray b8 and the main ray b9 become non-parallel, and the shape of the viewing area becomes a diamond shape.

$$\frac{c}{b}d_1 < \frac{b}{a}d_0 \quad (4)$$

In addition, a diamond shape is a quadrilateral shape in which two sides of the spatial-image-forming iris surface g112 formed forward in the x-axis direction (traveling direction of an incident ray) are longer than two sides formed rearward in the x-axis direction (traveling directions of the main ray b8 and the main ray b9).

With the infinite pentagonal shape, since an image of the image display apparatus 1 is visible to an observer even when the observer becomes infinitely distant from the spatial-image-forming iris surface g112, it is also very effective for a fellow passenger sitting in a back seat of a vehicle to view the image. Thus, a designer of the image display apparatus 1 may select design conditions of Formula (3) or Formula (4) depending on purpose.

Next, a spatial-image-forming iris surface due to the first combiner 51 will be described.

As illustrated in FIG. 2, the main ray b12 and the main ray b13 of the virtual image g121 inclined at an angle of $+2\theta_1$ with respect to the line perpendicular to the optical axis are reflected upward at an angle of $+2\theta_1$ with respect to the optical axis. Thus, the first combiner 51 forms the spatial-image-forming iris surface g122 with a size $(c/b)d_1$ at a distance c from a contact surface with the line perpendicular to the optical axis of the first combiner 51. Like the spatial-image-forming iris surface g112 due to the second combiner 52 (FIG. 1), a viewing area in an infinite pentagonal shape or a diamond shape shown with an area g123 is formed in front of and behind the spatial-image-forming iris surface g122. Also, functions of the spatial-image-forming iris surface g122 and the viewing area are the same as those in the second combiner 52.

A condition for the viewing area g113 of the second combiner 52 illustrated in FIG. 1 and the viewing area g123 of the first combiner 51 illustrated in FIG. 2 to avoid crosstalk without superimposition as illustrated in FIG. 4 is shown in the following Formula (5).

$$|\theta_1| \geq \frac{1}{2}\tan^{-1}\left(\frac{d_1}{b}\right) \quad (5)$$

Because the second combiner 52 and the first combiner 51 are tilted and disposed to be spaced apart from each other by an absolute value of the angle $\theta_1$ in Formula (5) or more, crosstalk does not occur between display images.

Next, a spatial-image-forming iris surface due to the third combiner 53 will be described.

As illustrated in FIG. 3, the main ray b22 and the main ray b23 of the aerial image g131 inclined at an angle of $-2\theta_1$ in a traveling direction of a main ray with respect to a main plane of the second combiner 52 are reflected downward by an angle of $-2\theta_1$ with respect to the optical axis. Thus, the third combiner 53 forms the spatial-image-forming iris surface g132 with a size $(c/b)d_1$ at a distance c from a contact surface with the line perpendicular to the optical axis of the third combiner 53. Like the spatial-image-forming iris surface g112 due to the second combiner 52 (FIG. 1), a viewing area in an infinite pentagonal shape or a diamond shape shown with an area g133 is formed in front of and behind the spatial-image-forming iris surface g132. Also, functions of the spatial-image-forming iris surface g132 and the viewing area are the same as those in the second combiner 52.

A condition for the viewing area g113 of the second combiner 52 illustrated in FIG. 1 and the viewing area g133 of the third combiner 53 illustrated in FIG. 3 to avoid crosstalk without superimposition as illustrated in FIG. 4 is shown in Formula (5) above.

Here, when an angle $+\theta_1$ with respect to a contact surface with the line perpendicular to the optical axis of the first combiner 51 and a contact surface with the line perpendicular to the optical axis of the second combiner 52 or an angle $-\theta_1$ with respect to a contact surface with the line perpendicular to the optical axis of the third combiner 53 and a contact surface with the line perpendicular to the optical axis of the second combiner 52 is increased, the viewing areas g113, g123, and g133 illustrated in FIGS. 1 to 4 become distant from one another. Thus, a viewing position may be changed in a direction of an observer by satisfying conditions for avoiding crosstalk to change an angle.

<Brightness of Aerial Image of Spatial-Image-Forming Iris Surface>

Next, brightness of a spatial-image-forming iris surface will be described. In addition, although an aerial image of the spatial-image-forming iris surface g112 due to the second combiner 52 will be described below, the description is also relevant to an aerial image of the spatial-image-forming iris surface g122 due to the first combiner 51 and an aerial image of the spatial-image-forming iris surface g132 due to the third combiner 53.

Here, a case in which a single transparent concave reflector is attached to a windshield of a vehicle, and an image is projected from the projector to the transparent concave reflector will be described. When reflectance of the transparent concave reflector is, for example, 4%, a display image of an aerial image formed by being reflected from the transparent concave reflector has brightness based on the reflectance and is difficult for an observer to view because the brightness normally decreases. To compensate for darkness due to the reflectance R of 4%, brightness of an image projected from the projection unit needs to be twenty-five times as bright, for example, a lamp of the projector needs to be twenty-five times as bright. Thus, it is not practical in terms of service life of a part or power consumption.

Figure 5:
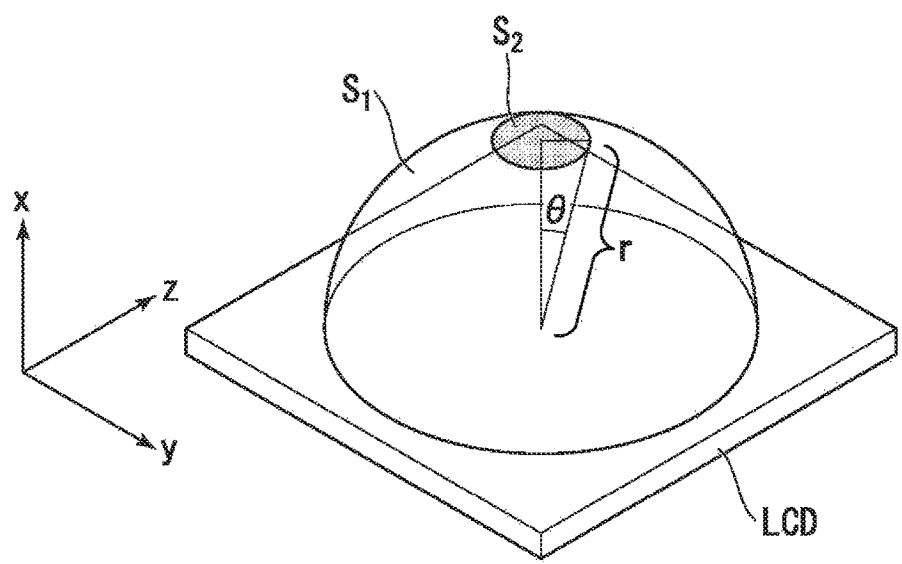
FIG. 5 is a view describing brightness of an aerial image of a spatial-image-forming iris surface according to the first embodiment.

FIG. 5 is a view describing brightness of an aerial image of a spatial-image-forming iris surface according to the embodiment. In FIG. 5, a vertical direction of a liquid crystal display (LCD) is an x-axis direction, a horizontal direction of the LCD is a y-axis direction, and a depth direction of the LCD is a z-axis direction.

First, brightness of a normal LCD will be described using FIG. 5. In FIG. 5, an angle $\theta$ is an angle corresponding to an angle formed by the optical axis (line b7) of the viewing area g113 or formed by the central lines (line b11, line b21) of the viewing areas g123 and g133 in FIGS. 1 to 4 and the main rays b9, b12, and b22. In addition, in an embodiment, the angle $\theta$ is also referred to as a diffusion angle. Also, an area $S_1$ is a surface area of a hemisphere having a radius r on a surface of the LCD, and the area $S_1 = 4\pi r^2/2 = 2\pi r^2$, based on the formula for obtaining the surface area of a sphere. Also, an area $S_2$ is an area of a curved portion where a cone having a height r and the hemisphere overlap. The area $S_2 = \pi(r\theta)^2$, and the area $S_2$ becomes $\pi(r\cdot\tan(\theta))^2$ when approximated as a plane.

When a proportion occupied by the area $S_2$ in the area $S_1$ of the hemisphere is defined as a brightness effect, the brightness effect may be the following Formula (6).

$$\text{Brightness effect} = \frac{S_1}{S_2} = \frac{2\pi r^2}{\pi \{r \cdot \tan(\theta)\}^2} = \frac{2}{\{\tan(\theta)\}^2} \quad (6)$$

In the image display apparatus 1, when transparency is emphasized, each of the first combiner 51 to the third combiner 53 may have the transmittance T of 96%, for example, and the reflectance R of 4%, for example.

Even when the reflectance is 4%, brightness needs to be twenty-five times higher to achieve the same brightness as the LCD. For this purpose, the diffusion angle θ at which $S_1/S_2$ is 25 needs to be selected. Since a value is 25 in Formula (6), the diffusion angle θ in this condition is 15.8°.

Consequently, in FIGS. 1 to 4, when the diffusion angle θ is 15.8° or smaller, the brightness of the display image may become twenty-five times as bright even when the first combiner 51 to the third combiner 53 having the reflectance of 4% are used. As a result, the display image having the same brightness as the LCD may be provided using the image display apparatus 1 even when the first combiner 51 to the third combiner 53 having the reflectance R of 4% are used.

Here, the size of the spatial-image-forming iris surface g112 at a distance H from the image display apparatus 1 is 2H·tan(θ). When H=1[m] and the diffusion angle θ is 15.8°, since the size of the spatial-image-forming iris surface g112 has a diameter of approximately 57 cm, a viewing area of an observer may be sufficiently covered. In addition, the observer is, for example, a driver, a fellow passenger sitting in a passenger seat, or a fellow passenger sitting in a back seat of a vehicle.

As described above, in the embodiment, a characteristic in which display images in different viewing areas have substantially the same brightness may be realized by stacking the first combiner 51 to the third combiner 53 having a characteristic in which the transmittance is considerably larger than the reflectance, where the reflectance R=4%, and the transmittance T(=1−R)=96%.

Also, since a double image due to back reflection is generated when the thickness of the first combiner 51 to the third combiner 53 in the x-axis direction is thick, a moth-eye structure film, which is a film for preventing reflection, or an AR coating is preferably provided at a back surface of each of the first combiner 51 to the third combiner 53.

Also, although an example in which the multiple stacked combiners 50 include three combiners has been described with reference to FIGS. 1 to 4, the number of combiners may also be two, or four or more. For example, when two combiners are present, the multiple stacked combiners 50 need to include two of the first combiner 51 to the third combiner 53. For example, when the multiple stacked combiners 50 include the first combiner 51 and the third combiner 53, the first combiner 51 and the third combiner 53 may be disposed so that a real image is formed between the first combiner 51 and the third combiner 53. In this case, the first combiner 51 may be disposed such that an angle of a contact surface with the optical axis is $-(\frac{1}{2})\theta_1$ with respect to the line perpendicular to the optical axis, and the third combiner 53 may be disposed such that an angle of a contact surface with the optical axis is $-(\frac{1}{2})\theta_1$ with respect to the line perpendicular to the optical axis.

<Multiple Reflection and Transmission of Light Due to the Multiple Stacked Combiners 50>

Here, multiple reflection and transmission of light due to the multiple stacked combiners 50 will be described.

Figure 6:
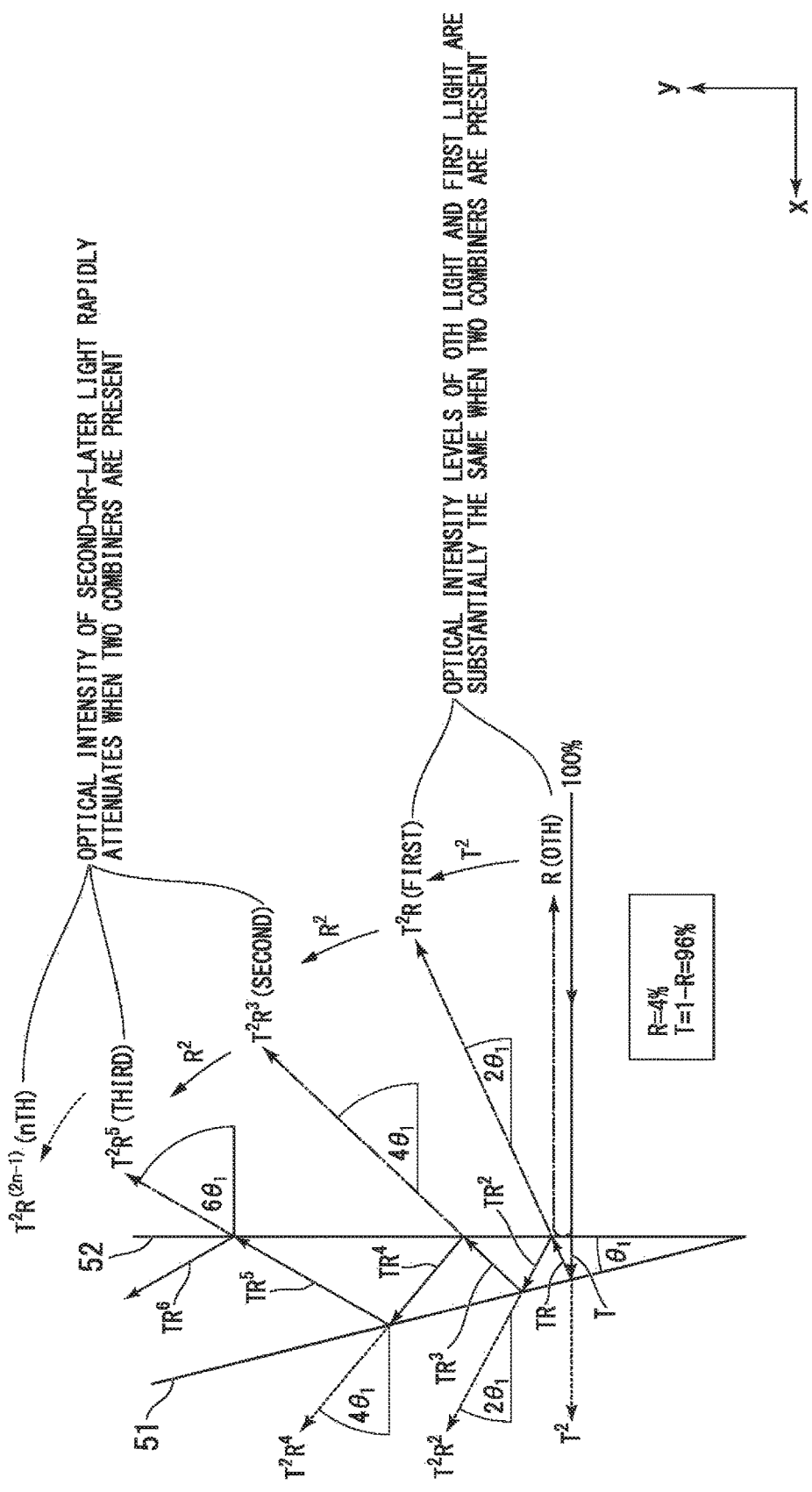
FIG. 6 is a view describing multiple reflection and transmission of light in a model with two combiners.

FIG. 6 is a view describing multiple reflection and transmission of light in a model with two combiners. In FIG. 6, portions of the first combiner 51 and the second combiner 52 are illustrated as a model, for example. The coordinate system is the same as in FIGS. 1 to 4. Also, lower ends of the first combiner 51 and the second combiner 52 are adhered to each other, and a contact surface with the optical axis of the first combiner 51 is disposed so as to be inclined with an angle of inclination of $+\theta_1$ with respect to a contact surface with the optical axis of the second combiner 52.

In FIG. 6, focus is on the portions of the first combiner 51 and the second combiner 52, and each of the first combiner 51 and the second combiner 52 will be considered as a straight line in the description. Also, although it is assumed that an anti-reflection treatment such as a moth-eye structure film is performed on a back surface of each of the first combiner 51 and the second combiner 52, and back reflection is not taken into consideration in the example illustrated in FIG. 6, back reflection R may be 8%, for example, when it is taken into consideration.

Light projected from the projector 10 at a lower side of FIG. 6 is substantially vertically incident on the second combiner 52 by 100% to form a display image on the second combiner 52.

Light with the transmittance T of 96% transmitted through the portion of the second combiner 52 is reflected upward by $2\theta_1$ from a surface of the first combiner 51, with the reflectance R of 4%. Consequently, the intensity of reflected light is TR. The reflected light passes through the second combiner 52 again, some of the reflected light is reflected therefrom, and some of the reflected light is transmitted therethrough. The intensity of partially reflected light is $TR^2$, the intensity of partially transmitted light is $T^2R$, and the partially transmitted light becomes first light reflected upward by $2\theta_1$ and forms the spatial-image-forming iris surface g122 and the viewing area g123 in FIGS. 2 and 4.

The partially reflected light reaches the first combiner 51 again, and some of the partially reflected light is reflected upward by $4\theta_1$ from a surface of the first combiner 51 again. The intensity of the reflected light is $TR^3$.

The partially reflected light reaches the second combiner 52 again, and some of the partially reflected light is reflected therefrom, and some of the partially reflected light is transmitted therethrough. The intensity of the partially reflected light is $TR^4$, the intensity of partially transmitted light is $T^2R^3$, and the partially transmitted light becomes second light reflected upward by $4\theta_1$. Since a coefficient of $R^3=(0.04)^3$ affects the intensity of the second light, the intensity of the second light rapidly attenuates compared to the first light, and the second light is invisible to the observer.

Likewise, by repeatedly being partially reflected and partially transmitted, some of third light is transmitted upward by $6\theta_1$, and the intensity of the transmitted light is $T^2R^5$.

Some of $n^{th}$ light is transmitted upward by $2n\theta_1$, and with the intensity of $T^2R^{(2n-1)}$.

That is, while the attenuation rate from $0^{th}$ light to the first light is $T^2=(0.96)^2$, and the intensity hardly attenuates, the attenuation rate from the first light to the second light is $R^2=(0.04)^2$ and the intensity rapidly attenuates. Also, the attenuation rate from the second light to the third light is $R^2=(0.04)^2$ and the intensity rapidly attenuates. In addition, the attenuation rate from the $n^{th}$ light to $(n+1)^{th}$ light is $R^2=(0.04)^2$ and the intensity rapidly attenuates. Consequently, with the image display apparatus having two stacked combiners, only display images of $0^{th}$ light and first light is visible to an observer, and the display images of the $0^{th}$ light and the first light have substantially the same brightness. In addition, display images of second-or-later light are almost invisible to the observer.

In addition, as described in the example above, a relationship T»R is established between the transmittance T and the reflectance R.

Next, multiple reflection and transmission of light in a model of multiple stacked combiners including three stacked combiners will be described.

Figure 7:
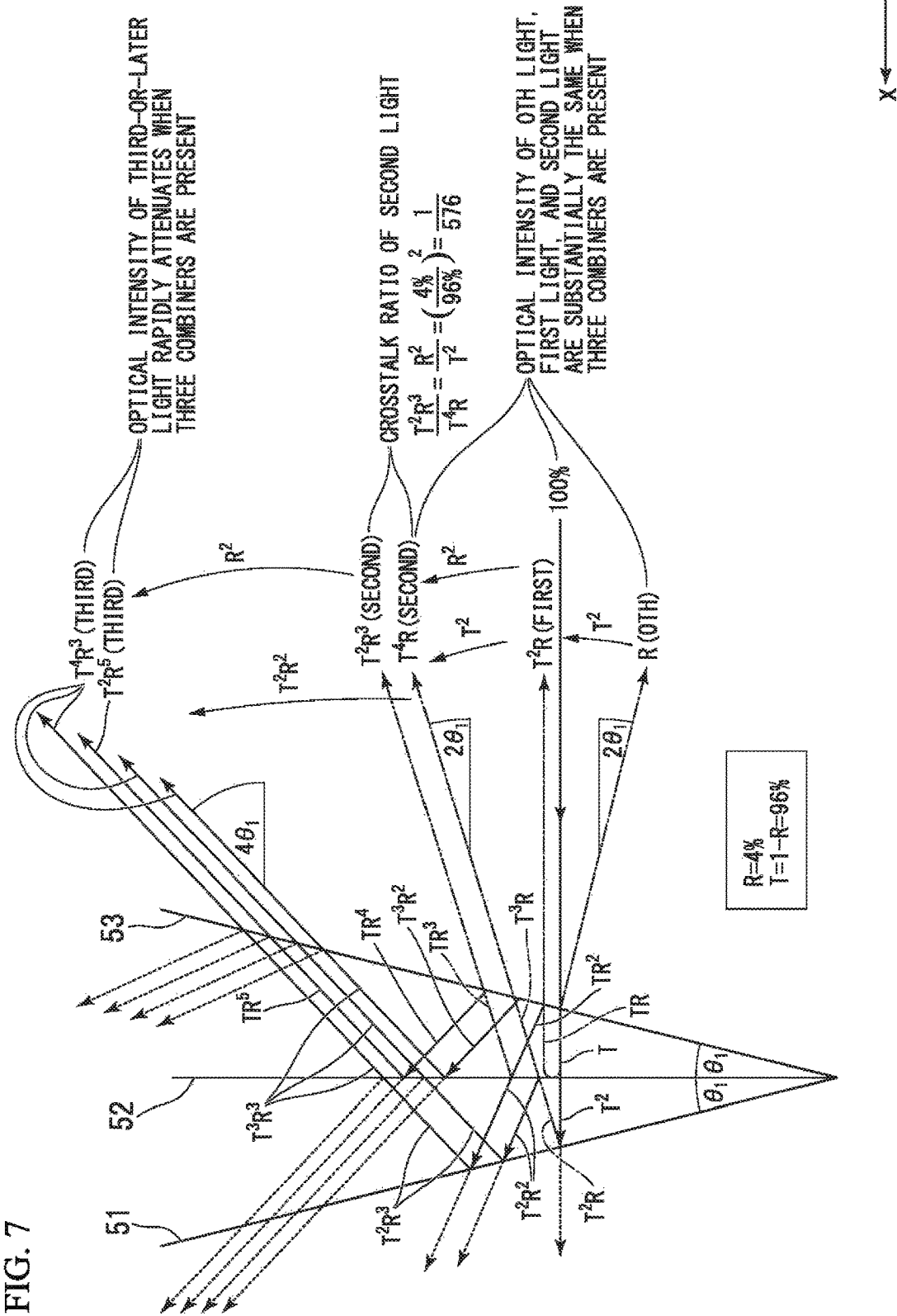
FIG. 7 is a view describing multiple reflection and transmissions of light in a model with three combiners.

FIG. 7 is a view describing multiple reflection and transmission of light in a model with three combiners. The coordinate system is the same as in FIGS. 1 to 4. Also, lower ends of the first combiner 51 to the third combiner 53 are adhered to each other, and a contact surface with the optical axis of the first combiner 51 is disposed with an angle of inclination of $+\theta_1$ with respect to a contact surface with the optical axis of the second combiner 52, and a contact surface with the optical axis of the third combiner 53 is disposed with an angle of inclination of $-\theta_1$ with respect to a contact surface with the optical axis of the second combiner 52.

Also, as in FIG. 6, each of the first combiner 51 to the third combiner 53 will be considered as a straight line. Also, in an example illustrated in FIG. 7, it is assumed that an anti-reflection treatment such as application of a moth-eye structure film is performed on a back surface of each of the first combiner 51 to the third combiner 53, and back reflection is not taken into consideration.

When three combiners are stacked, each of $0^{th}$ light, first light, and second light is used for one of three observers. Since the third light has intensity of $3T^4R^3+T^2R^5$ upward by $4\theta_1$ and has reflectance R=0.04 in FIG. 7, the intensity of the third-or-later light rapidly attenuates, and the third-or-later light is substantially invisible to observers.

The intensity of $0^{th}$ light reflected downward by $2\theta_1$ at the lower side of FIG. 7 is R, and the $0^{th}$ light forms the spatial-image-forming iris surface g132 and the viewing area g133 in FIGS. 3 and 4.

Also, the intensity of first light reflected by 0° at the center of FIG. 7 is $T^2R$, and the first light forms the spatial-image-forming iris surface g112 and the viewing area g113 in FIGS. 1 and 4.

In addition, the intensity of second light reflected upward by $2\theta_1$ at the upper side of FIG. 7 is $T^4R+T^2R^3$, and the second light forms the spatial-image-forming iris surface g122 and the viewing area g123 in FIGS. 2 and 4.

The intensity of the second light is $T^4R\ T^2R^3$. As illustrated in FIG. 7, the second light of $T^4R$ is light partially reflected from the first combiner 51l disposed at the innermost portion, and the second light of $T^2R^3$ is light partially reflected from the second combiner 52 disposed at a central portion. That is, the second light of $T^4R$ displays the virtual image g121 at an inner portion of the first combiner 51 in FIG. 4, and the second light of $T^2R^3$ displays an image at a mirror symmetric position reflected three times by the second combiner 52, the third combiner 53, and the second combiner 52 in FIG. 4.

In this way, since the virtual image g121 due to the first combiner 51 and the image at the mirror symmetric position reflected three times by the second combiner 52, the third combiner 53, and the second combiner 52 are simultaneously visible and superimposed on each other in the spatial-image-forming iris surface g122 and the viewing area g123 in FIGS. 2 and 4, crosstalk occurs. Even when the two images are the same, since positions at which the two images are visible are spatially different, the two images become three-dimensional superimposed images with different positions, depths, and angles.

However, the crosstalk ratio between the two images becomes $T^2R^3/T^4R=(R/T)^2=(0.04/0.96)^2=1/576$. Consequently, since only 0.17% of noise components are generated, the noise components are almost invisible to an observer.

As described using FIG. 7, when three combiners are stacked, the attenuation rate from $0^{th}$ light to the first light is $T^2=(0.96)^2$, and the intensity hardly attenuates. The attenuation rate from the first light to second signal light is $T^2=(0.96)^2$ and hardly attenuates. The attenuation rate from the second signal light to third signal light is $T^2R^2=(0.96\times 0.04)^2$, and the intensity rapidly attenuates. The attenuation rate from second noise light to third noise light is $R^2=(0.04)^2$ and the intensity rapidly attenuates.

In this way, according to the embodiment, with the image display apparatus 1 using the multiple stacked combiners 50 including three combiners, bright display images having substantially the same optical intensity are visible to three predetermined observers, and an excellent characteristic in which optical energy is hardly propagated in directions other than directions of the three predetermined observers may be realized.

The characteristic may be achieved because the relationship T»R is established between the transmittance T and the reflectance R. In this way, even when the reflectance R is 4%, for example, loss of the 4% reflectance is compensated for in the image display apparatus 1 according to the embodiment by setting the diffusion angle θ of the image display apparatus 1 within 15.8°, thereby realizing brightness equivalent to that when an LCD or an image on a screen of a projector is directly viewed.

<Distortion of a Display Image Due to Multiple Refraction of Light Transmitted by a Plurality of Combiners>

Next, distortion of a display image due to multiple refraction of light transmitted by a plurality of combiners will be described.

Since multiple combiners are stacked in the image display apparatus 1, when a display image is displayed using reflected light from a combiner installed at the back of the traveling direction of an incident ray, light is displayed after passing through several combiners in front of the combiner as described above. When light is transmitted through the plurality of combiners, refraction occurs several times at interfaces of the plurality of combiners. Since a direction and position of a ray changes due to this physical phenomenon, distortion of the display image may occur.

Figure 8:
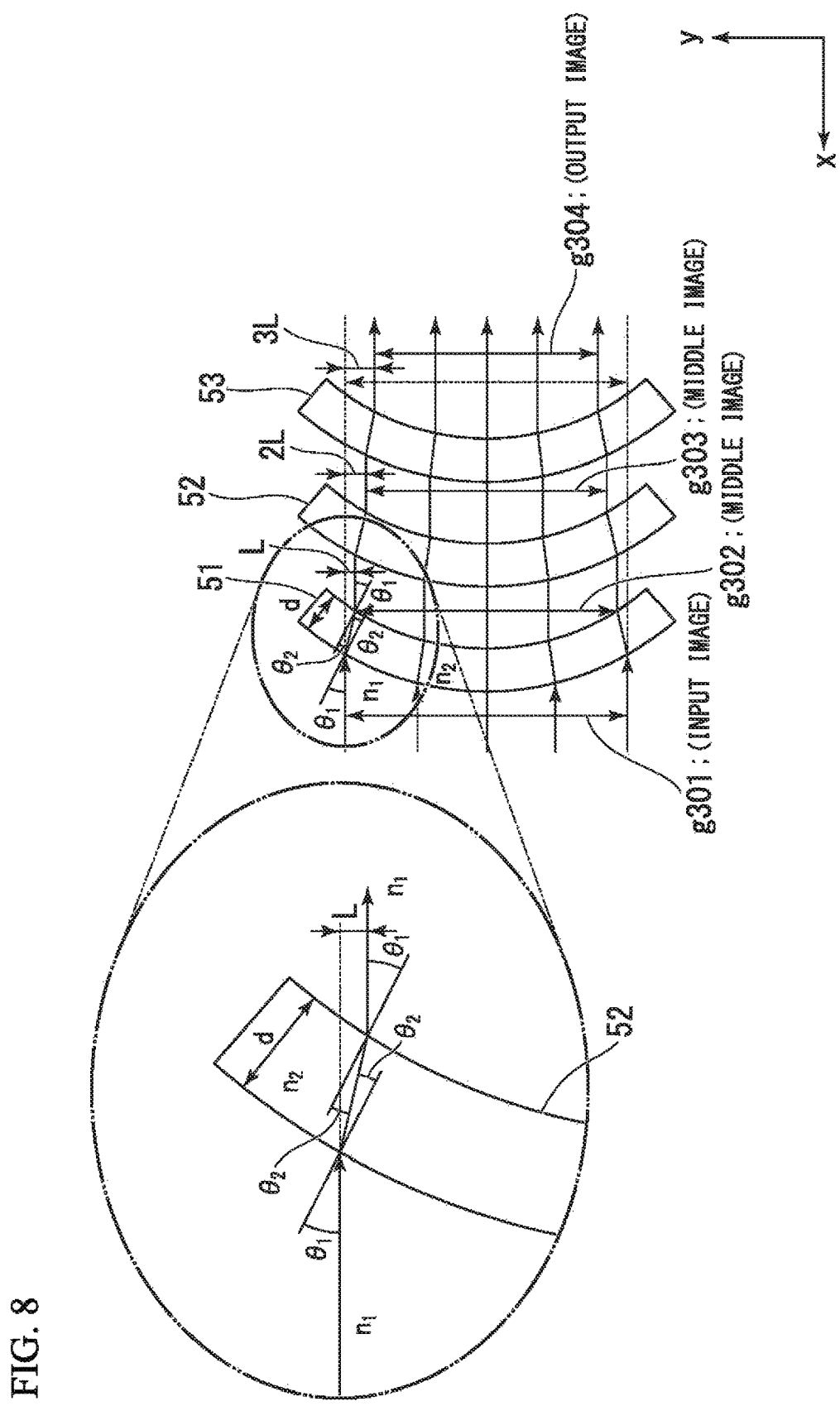
FIG. 8 is a view illustrating a model of image distortion when light is transmitted through all three stacked combiners.

FIG. 8 is a view illustrating a model of an image distortion when light is transmitted through all three stacked combiners.

Light entering the human eye passes through the lens pupil having a diameter of 2 mm to 8 mm of a pupil of a lens and views an image formed on the retina. Thus, since an image of parallel light not being diffused is formed on the retina, it is considered non-problematic to examine image distortion only using the main ray component. Thus, in FIG. 8, only the main ray component entering the human eye is illustrated as image information. Also, the main ray component is substantially parallel light in an example illustrated in FIG. 8. Also, in FIG. 8, a reference numeral g301 represents an input image, reference numerals g302 and g303 represent middle images, and a reference numeral g304 represents an output image. Here, a middle image is an image formed between the first combiner 51 to the third combiner 53.

The greatest factor that causes high image distortion due to a direction of light being significantly changed by the first combiner 51 to the third combiner 53 is an angle of incidence to the first combiner 51 to the third combiner 53.

When each of the first combiner 51 to the third combiner 53 has a thickness of d, a surface of incidence and an output surface become substantially parallel when a radius of curvature is large enough with respect to the thickness d. When an angle of incidence is $\theta_1$ and a refracting angle is $\theta_2$ at an interface of incidence, an angle of incidence is $\theta_2$ and a refracting angle is $\theta_1$ at an output interface. When the refractive index of air is $n_1$, and the refractive index of the combiner is $n_2$, $n_1 \cdot \sin \theta_1 = n_2 \cdot \sin \theta_2$ according to Snell's law.

When the surface of incidence and the output surface are substantially parallel, although a direction of light does not change because it is refracted twice, a position of the ray shifts by L of FIG. 8. L is $\{d \cdot \sin(\theta_1 - \theta_2)\}/\cos \theta_2 = d \cdot \cos \theta_1 (\tan \theta_1 - \tan \theta_2)$. In addition, when $\theta_1$ and $\theta_2$ are small, L is $d (\theta_1 - \theta_2) = d \cdot \theta_2 (n_2 - n_1)/n_1$.

Here, the refractive index of air $n_1 = 1.0$, and L becomes $d \cdot \theta_2/2$ when the refractive index of the first combiner 51 to the third combiner 53 $n_2 = 1.5$.

Since light is vertically incident on central portions of the first combiner 51 to the third combiner 53, $\theta_1 = 0°$ and $\theta_2 = 0$. Although an angle of incidence increases from the central portions, when the angle of incidence is linearly increased with respect to a position, $\theta_2$ also linearly increases with respect to the position. In this way, L linearly increases from $d \cdot \theta_2/2$ with respect to an L° position. In this case, the image is not particularly distorted and is only reduced.

The maximum value of $\theta_2$ is physically a critical angle $\theta_c$. Since $\theta_c = 41.8°$ when $n_1 = 1.0$ and $n_2 = 1.5$, Lmax, which is the maximum value of L, becomes 0.36d. When three combiners are stacked, the maximum value of L is 3Lmax. 3Lmax becomes 1.08d, and the image is substantially reduced by as much as a thickness of the combiner.

Since the example above is related to a case in which light is incident by 90°, the maximum value of L is about half of the above-mentioned value in a case in which light in incident at 45°. In this way, even when the first combiner 51 to the third combiner 53 have a thickness of 1 cm, the thickness appears only about 5 mm smaller.

As described above, distortion hardly occurs with the image display apparatus 1 according to the embodiment.

In addition, because $L = d \cdot \theta_2/2$, an image shift distance is obtained by a function of the refracting angle $\theta_2$ and the thickness d of the first combiner 51 to the third combiner 53. Consequently, since distortion becomes a problem when the thicknesses d of the first combiner 51 to the third combiner 53 change depending on a portion of each of the first combiner 51 to the third combiner 53, the thicknesses d of the first combiner 51 to the third combiner 53 are preferably uniform.

Since the angle of incidence $\theta_1$ changes and causes the refracting angle $\theta_2$ to change when the radii of curvature of the first combiner 51 to the third combiner 53 rapidly change, radii of curvature the first combiner 51 to the third combiner 53 are preferably constant.

As described above, the image display apparatus 1 according to the embodiment is wherein: a projection image of the projector 10 is formed as a first image of size $d_0$ on an angularly uniform diffusion film (diffusion film 20) or on a normal diffusion film (diffusion film 20); the condensing lens 30 with a focal length $f_0$ is installed to be adhered to the diffusion film; one or a plurality of image-forming lenses 40 with a lens pupil diameter $d_1$ at a synthetic focal length $f_1$: $((1/a)+(1/b)=1/f_1))$ is installed at a distance $f_0 = a$ from the condensing lens; an aerial real image of the first image (e.g., the real image g111 of FIG. 1) is formed at a distance b from a main plane of the image-forming lens with a magnification factor b/a by the image-forming lens; a plurality of transparent concave reflectors each with a focal length $f_2$: $((1/b)+(1/c)=(1/f_2))$ and reflectance of about 4% to 50% (first combiner 51, second combiner 52, and third combiner 53) is stacked at intervals at which the plurality of transparent concave reflectors are able to come into contact with one another by changing angles formed between one another by approximately $\theta 1:(\theta 1 \geq (\frac{1}{2})\tan^{-1}(d_1/b))$ near the aerial image having a size of approximately $(b/a)d_0$; an aerial image of a lens pupil of the image-forming lens (spatial-image-forming iris surface g112, spatial-image-forming iris surface g122, and spatial-image-forming iris surface g132) with a size $(c/b)d_1$, which has a magnification factor c/b, is formed at a distance c in a direction of a main reflection ray of each of the transparent concave reflectors; and an infinite pentagonal viewing area is formed when $(c/b)d_1 \geq (b/a)d_0$ in front of and behind the aerial image of the lens pupil and a diamond-shaped viewing area is formed when $(c/b)d_1 < (b/a)d_0$ in front of and behind the aerial image of the lens pupil.

With the constitution above, according to the embodiment, a range in which a display image due to a real image is visible may correspond to several people, and bright display images having substantially the same brightness may be displayed to the several people. Also, according to the embodiment, an image display apparatus that hardly propagates optical energy to positions other than positions of several predetermined observers, thereby having high optical utilization efficiency, high transmittance, and high transparency, may be provided.

As described above, the image display apparatus 1 according to the embodiment includes the projection unit (the projector 10, the diffusion film 20, the condensing lens 30, and the image-forming lens 40) configured to project an image and a plurality of concave reflectors (the first combiner 51 to the third combiner 53) in which contact surfaces with optical axes of the concave reflectors (combiners) with respect to the optical axis b7 of the projection unit are disposed at different angles from one another. A first concave reflector of the plurality of concave reflectors (the first combiner 51) reflects at least a portion of an image projected by the projection unit to form a first image based on the image (one of an aerial image of the spatial-image-forming iris surface g112, the spatial-image-forming iris surface g122, and the spatial-image-forming iris surface g132). A second concave reflector of the plurality of concave reflectors (the second combiner 52) transmits a portion of an image projected by the projection unit and reflects a portion of the image to form a second image based on the image (one other than the first image among the aerial image of the spatial-image-forming iris surface g112, the spatial-image-forming iris surface g122, and the spatial-image-forming iris surface g132).

With the constitution above, since the attenuation rate from $0^{th}$ light to $(n-1)^{th}$ light hardly attenuates, and the attenuation rate of $(n-1)^{th}$-or-later light rapidly attenuates, the $(n-1)^{th}$-or-later light is almost invisible to an observer. In addition, in the embodiment, when the above conditions (such as a condition related to the diffusion angle $\theta$) are satisfied, brightness of a display image of $k^{th}$ light (k is an integer equal to or greater than 0) and brightness of a display image of $(k+1)^{th}$ light becomes substantially the same. As a result, according to the embodiment, each of n observers may view only any one of display images due to the $0^{th}$ light to $(n-1)^{th}$ light which are more similar in brightness compared to the related art. As a result, according to the embodiment, display images more similar in brightness compared to the related art may be displayed to several people.

Also, in the image display apparatus 1 according to the embodiment, the projection unit (the projector 10, the diffusion film 20, the condensing lens 30, and the image-forming lens 40) includes the image-forming lens 40 configured to form an image, any one of the first concave reflector (one of the first combiner 51 to the third combiner 53), the second concave reflector (one of the first combiner 51 to the third combiner 53r other than the first concave reflector), and a position between the first concave reflector and the second concave reflector is disposed at a position of the real image g111 formed by the image-forming lens 40, the first image (one of the aerial image of the spatial-image-forming iris surface g112, the spatial-image-forming iris surface g122, and the spatial-image-forming iris surface g132) is formed on the basis of one of the real image g111, the virtual image g121, and the aerial image g131 formed by the first concave reflector, the second image (one of the aerial image of the spatial-image-forming iris surface g112, the spatial-image-forming iris surface g122, and the spatial-image-forming iris surface g132) is formed on the basis of one of the real image, the virtual image, and the aerial image other than the first image formed by the second concave reflector, and a type of one of the real image, the virtual image, and the aerial image formed by the second concave reflector (for example, the real image when the second concave reflector is the second combiner 52) is different from a type of one of the real image, the virtual image, and the aerial image formed by the first concave reflector (for example, the virtual image when the first concave reflector is the first combiner 51).

With the constitution above, according to the embodiment, while the attenuation rate from $0^{th}$ light to first light hardly attenuates, the attenuation rate from the first light to second light, the attenuation rate from the second light to third light, and the attenuation rate from $n^{th}$ light to $(n+1)^{th}$ light rapidly attenuates when two layers of combiners are present. As a result, with an image display apparatus using two stacked combiners, display images more similar in brightness compared to the related art can be provided to two observers, and an excellent characteristic in which optical energy is hardly propagated in directions other than directions of the two observers can be realized.

Also, for example, when three layers of combiners are present, and the third combiner 53, the second combiner 52, and the first combiner 51 are disposed in that order of being closest to farthest from the projector 10, an aerial image of the spatial-image-forming iris surface g112 due to $0^{th}$ light with respect to incident light is formed on the basis of the real image g111 formed on the second combiner 52. Also, an aerial image of the spatial-image-forming iris surface g122 due to second light with respect to incident light is formed on the basis of the virtual image g121 formed by the first combiner 51. In addition, an aerial image of the spatial-image-forming iris surface g132 due to $0^{th}$ light with respect to incident light is formed on the basis of the aerial image g131 formed by the third combiner 53. In this way, according to the embodiment, while the attenuation rate from $0^{th}$ light to the first light hardly attenuates, and the attenuation rate from the first light to second signal light hardly attenuates, the attenuation rate from the second signal light to third signal light and the attenuation rate from second noise light to third noise light rapidly attenuate. As a result, with the image display apparatus 1 using the multiple stacked combiners 50 including three combiners, display images more similar in brightness compared to the related art can be provided to three observers, and an excellent characteristic in which optical energy is hardly propagated in directions other than directions of the three observers may be realized.

That is, according to the embodiment, when n combiners are present, display images more similar in brightness compared to the related art can be provided to n observers, and an excellent characteristic in which optical energy is hardly propagated in directions other than directions of the n observers may be realized.

Also, in the image display apparatus 1 according to the embodiment, the diffusion angle θ of each of the first image (one of the aerial image of the spatial-image-forming iris surface g112, the spatial-image-forming iris surface g122, and the spatial-image-forming iris surface g132) and the second image (one of the aerial image of the spatial-image-forming iris surface g112, the spatial-image-forming iris surface g122, and the spatial-image-forming iris surface g132 other than the first image) is within an angle calculated on the basis of a distance c from aerial images (the spatial-image-forming iris surfaces g112, g122, and g132) respectively corresponding to the plurality of concave reflectors (the first combiner 51 to the third combiner 53).

With the constitution above, according to the embodiment, display screens more similar in brightness compared to the related art can be displayed to several people.

Also, in the image display apparatus 1 according to the embodiment, the projection unit (the projector 10, the diffusion film 20, the condensing lens 30, and the image-forming lens 40) includes the diffusion film 20 configured to diffuse rays from the projected image and the condensing lens 30 configured to condense the rays diffused by the diffusion film. The image-forming lens 40 forms an image of rays condensed by the condensing lens 30, the size of an image projected by the projection unit is $d_0$, the lens pupil diameter of the image-forming lens is $d_1$, a distance between the condensing lens and the image-forming lens is a, a distance in the optical axis direction between the image-forming lens and the second concave reflector (e.g., the second combiner 52) is b, the focal length $f_1$ of the image-forming lens satisfies the relational expression $\{(1/a)+(1/b)=(1/f_1)\}$, the first image (e.g., the spatial-image-forming iris surface g112) and the second image (e.g., the spatial-image-forming iris surface g122) is formed at a distance c from the real image in the optical axis direction, the focal length $f_2$ of each of the first concave reflector (e.g., the first combiner 51) and the second concave reflector satisfies the relational expression $\{(1/b)+(1/c)=(1/f_2)\}$, and size of each of the first image and the second image is $(c/b)d_1$.

With the constitution above, according to the embodiment, each of two observers can view only any one of display images due to $0^{th}$ light to first light on display screens more similar in brightness compared to the related art, . . . , and each of n observers can view only any one of display images due to $0^{th}$ light to $(n-1)^{th}$ light on display screens more similar in brightness compared to the related art. As a result, according to the embodiment, display screens more similar in brightness compared to the related art may be displayed to several people.

Also, in the image display apparatus 1 according to the embodiment, an angle $\theta_1$ between a contact surface with the optical axis (line b7) of the first concave reflector (e.g., the first combiner 51) and a contact surface with the optical axis of the second concave reflector (e.g., the second combiner 52) satisfies the relational expression $\{|\theta_1| \geq (\frac{1}{2}) \tan^{-1}(d_1/b)\}$.

With the constitution above, according to the embodiment, a superimposition between the spatial-image-forming iris surface g122 due to the first combiner 51 and the spatial-image-forming iris surface g112 due to the second combiner 52 can be prevented. As a result, according to the embodiment, two observers can view the same display image without a superimposition between the display images.

Also, in the image display apparatus 1 according to the embodiment, an infinite pentagonal viewing area is formed when $\{(c/b)d_1 \geq (b/a)d_0\}$ and a hexagonal (diamond-shaped) viewing area is formed when $\{(c/b)d_1 < (b/a)d_0\}$ in front of and behind the first image (e.g., the spatial-image-forming iris surface g112) and the second image (e.g., the spatial-image-forming iris surface g122).

With the constitution above, according to the embodiment, an infinite pentagonal viewing area may be formed or a hexagonal viewing area may be formed depending on a range in the optical axis direction of an area desired to be viewed by an observer. When the infinite pentagonal viewing area is formed, a display image can be visible to a driver and a fellow passenger in a back seat of a vehicle. In addition, when the diamond-shaped viewing area is formed, a display image visible only to the driver and invisible to the fellow passenger in the back seat of the vehicle can be displayed.

Also, in the image display apparatus 1 according to the embodiment, the number of the plurality of concave reflectors (e.g., the first combiner 51 to the third combiner 53) are three or more, a third concave reflector of the plurality of concave reflectors (the third combiner 53) is disposed between the projection unit and the first concave reflector (the first combiner 51) and reflects a portion of an image projected by the projection unit to form a third aerial image based on the image (the aerial image of the spatial-image-forming iris surface g132), and the second concave reflector (the second combiner 52) is disposed between the first concave reflector and the third concave reflector.

With the constitution above, according to the embodiment, even when three observers are present, display images of the same size that are more similar in brightness compared to the related art may be provided from the three combiners (the first combiner 51 to the third combiner 53) to the three observers.

Also, in the image display apparatus 1 according to the embodiment, the focal lengths of the plurality of concave reflectors (the first combiner 51 to the third combiner 53) have the same value, $f_2$.

With the constitution above, according to the embodiment, images of the same size that are more similar in brightness compared to the related art can be provided to a driver and a fellow passenger sitting in substantially the same position in the x-axis direction from the plurality of combiners (the first combiner 51 to the third combiner 53).

Also, in the image display apparatus 1 according to the embodiment, at least one of a moth-eye structure film and an anti-reflection (AR) coating for preventing reflection is provided at a surface or a back surface of the plurality of concave reflectors (the first combiner 51 to the third combiner 53).

With the constitution above, according to the embodiment, even when the thickness of the first combiner 51 to the third combiner 53 is thick, an occurrence of a double image due to back reflection can be reduced.

Also, according to the embodiment, since combiners are stacked in multiple layers, an effect in which the size of the displayed image remains unchanged even when the viewing area is widened by stacking several layers can be obtained.

Also, according to the embodiment, since the diffusion angle $\theta$ is set to be a predetermined angle or smaller as described above, a display image can be brightened compared to a conventional image display apparatus using a combiner having the same reflectance.

Also, according to the embodiment, since the transmittance is approximately 96%, an observer can view bright outside scenery.

Also, according to the embodiment, since light transmitted from the projector 10 is normal incoherent light (light emitting diode (LED) light, an ultra-high performance (UHP) lamp, etc.) instead of a laser beam, speckle noise is not generated.

Also, according to the embodiment, since an incoherent light optical system that does not use refraction or interference of light is used, and a combiner forms a viewing area only by one-time surface reflection, color separation and chromatic aberration do not occur. In addition, according to the embodiment, since the combiner is a transparent concave reflector formed with a portion of an acrylic dome having a simple shape, it is extremely easy to manufacture the combiner.

Also, according to the embodiment, since the combiner uses reflected light from the one-time surface reflection, high-order diffracted light is not generated.

Consequently, according to the embodiment, color separation of outside scenery, which is transmitted light, does not occur, and a clear image that is the same as that viewed through a windshield can be viewed.

Also, according to the embodiment, the size of the viewing area is determined on the basis of the relational expression. In this way, an observer can view a bright display image and bright outside scenery.

Also, according to the embodiment, since the combiner is a transparent acrylic concave reflector, a scattering element is not present, and superimposition of noise such as a rainbow of the sun's ray or degradation of contrast does not occur even when intense sun rays are radiated.

Also, according to the embodiment, since the combiner is a transparent acrylic concave reflector, the combiner can be easily manufactured compared to a hologram and the like, and an HUD, which is an inexpensive image display apparatus 1, can be realized.

Second Embodiment

An example of the image display apparatus 1 in which a real image is formed on the second combiner 52 has been described in the first embodiment.

When the image display apparatus 1 is mounted in a vehicle, an observer focuses on outside scenery visible through the first combiner 51 to the third combiner 53. In the image display device 1 according to the first embodiment, when viewing the display image information, the observer has to focus on the virtual image, the real image or the aerial image illustrated in FIGS. 1 to 4.

Thus, in the embodiment, an example in which a virtual image is formed by all combiners at positions in the background direction of the combiners will be described. In this way, when a virtual image is marked at a position at a distance of approximately 1 m from a combiner, the observer can view the display image without performing very much adjustment of the lens.

Figure 9:
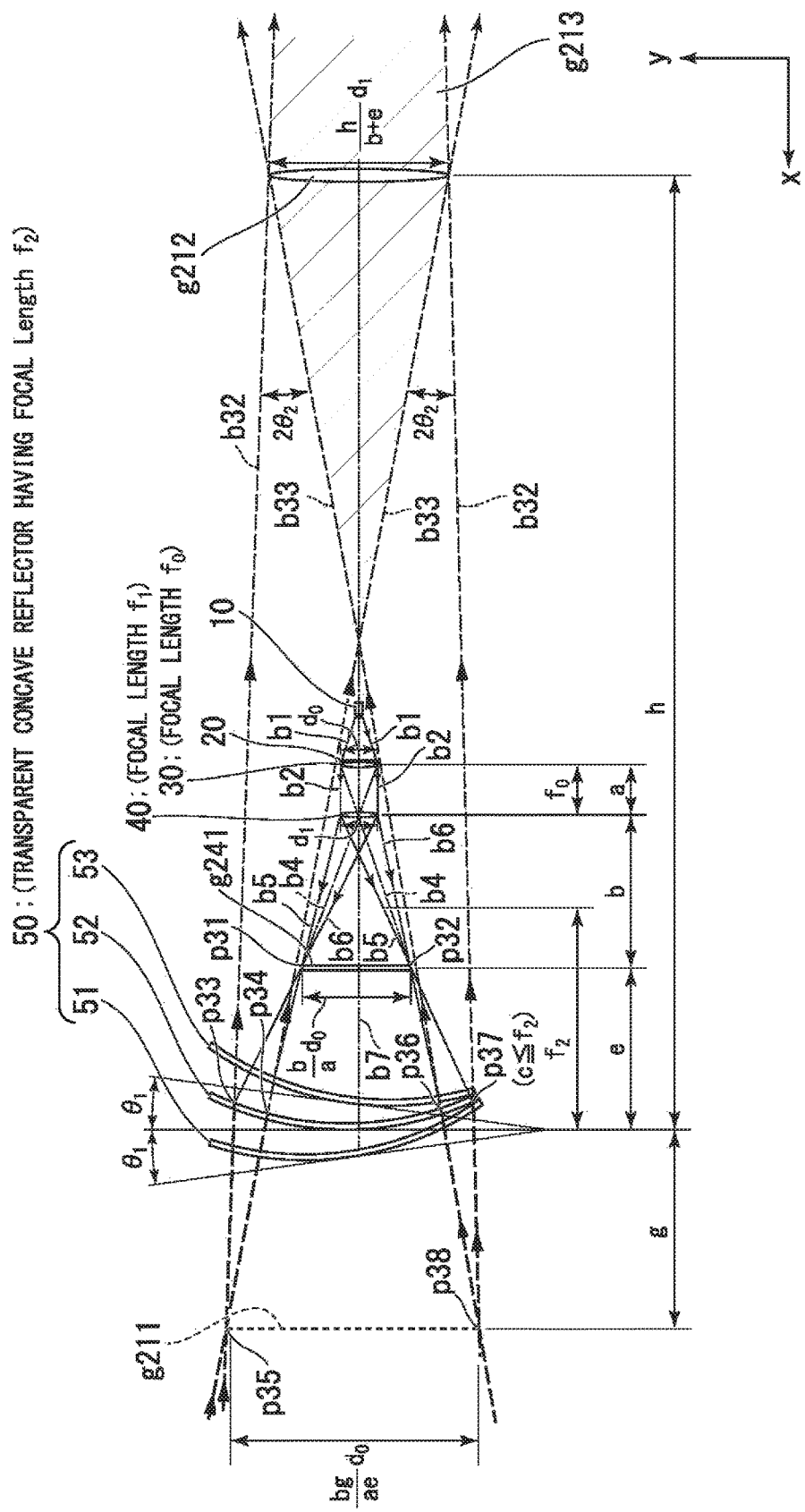
FIG. 9 is a view illustrating a constitution of an image display apparatus and a spatial-image-forming iris surface due to a virtual image of a second combiner according to a second embodiment.
Figure 10:
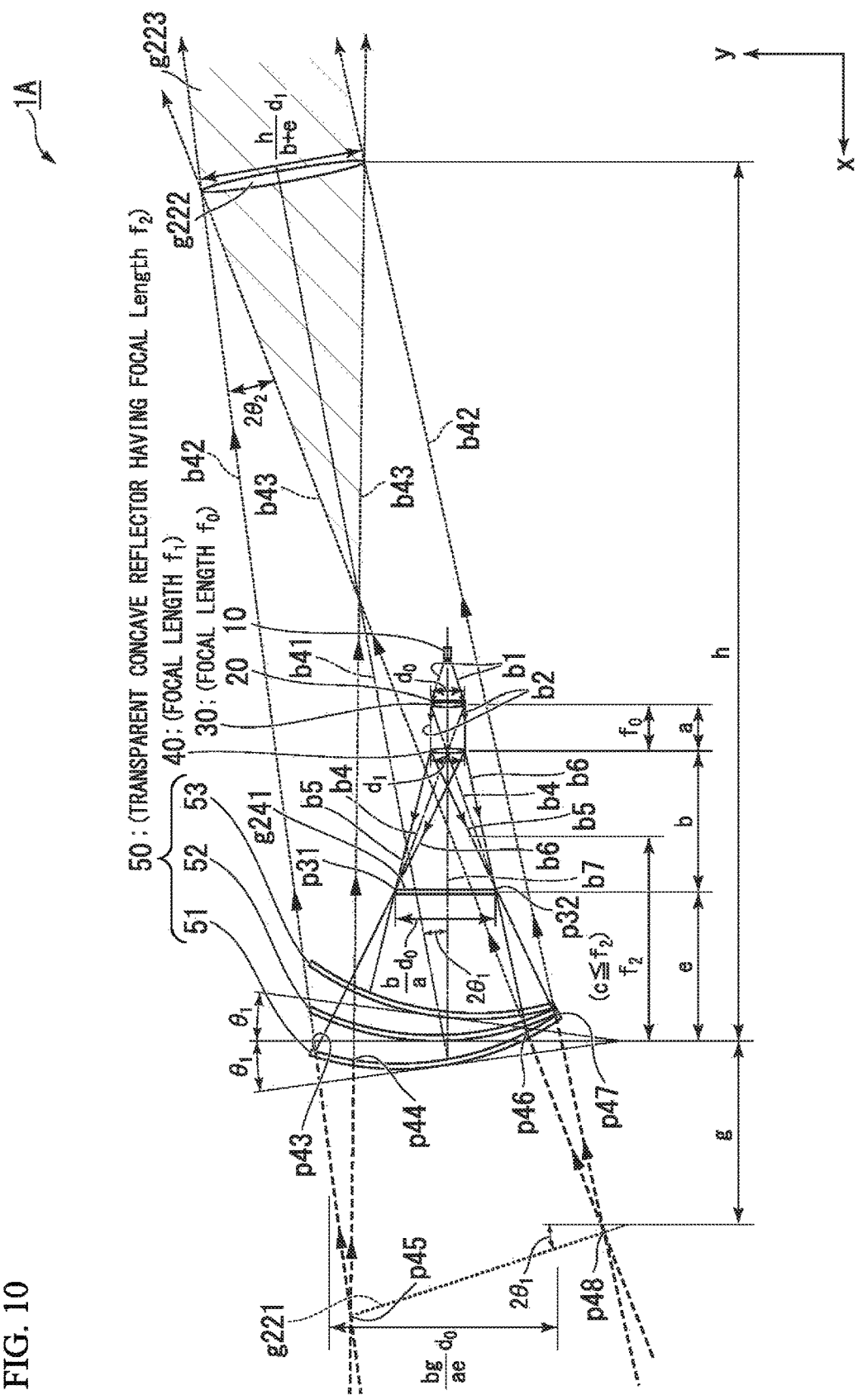
FIG. 10 is a view illustrating the constitution of the image display apparatus and a spatial-image-forming iris surface due to a virtual image of a first combiner according to the second embodiment.
Figure 11:
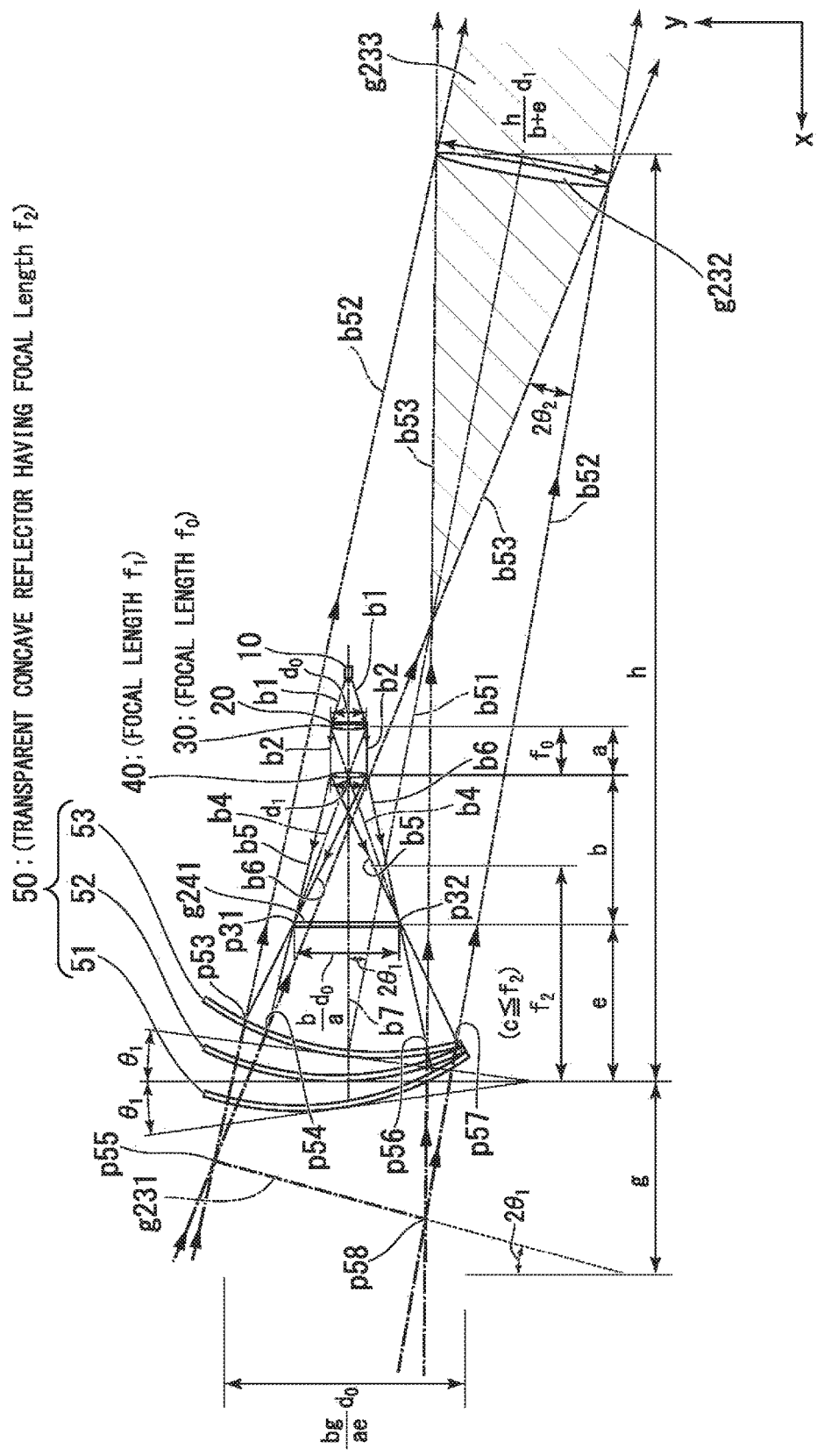
FIG. 11 is a view illustrating the constitution of the image display apparatus and a spatial-image-forming iris surface due to a virtual image of a third combiner according to the second embodiment.
Figure 12:
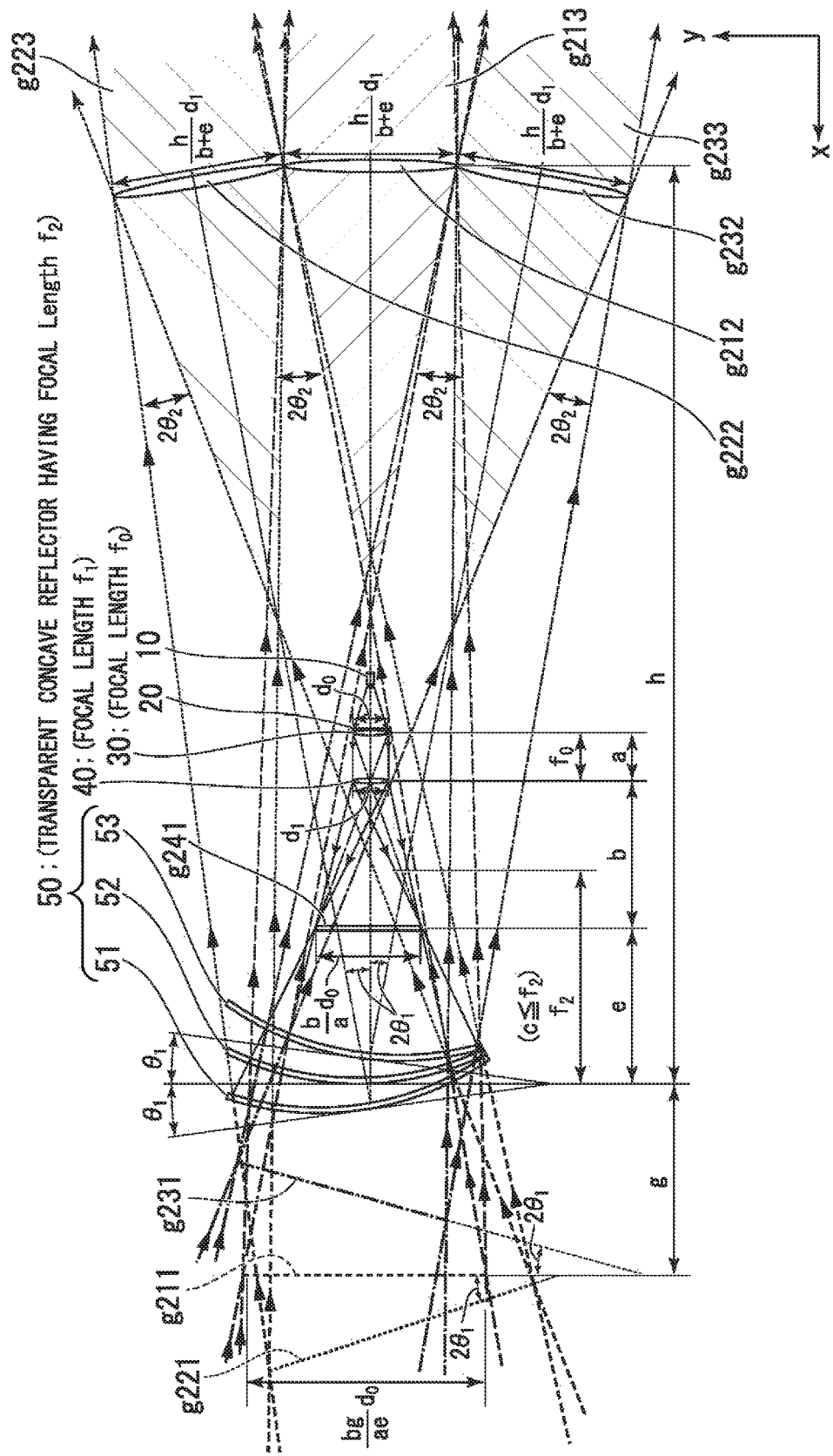

FIG. 9 is a view illustrating a constitution of an image display apparatus 1A and a spatial-image-forming iris surface g212 due to a virtual image g211 of the second combiner 52 according to the embodiment. FIG. 10 is a view illustrating the constitution of the image display apparatus 1A and a spatial-image-forming iris surface g222 due to a virtual image g221 of the first combiner 51 according to the embodiment. FIG. 11 is a view illustrating the constitution of the image display apparatus 1A and a spatial-image-forming iris surface g232 due to a virtual image g231 of the third combiner 53 according to the embodiment. FIG. 12 is a view in which FIGS. 9 to 11 are synthesized. In addition, although an example in which a viewing area is formed in a diamond shape is illustrated in FIGS. 9 to 12, the viewing area according to the second embodiment may also have an infinite pentagonal shape (infinite pentagonal shape). Also, like in the first embodiment, the reflectance R of each of the first combiner 51, the second combiner 52, and the third combiner 53 is preferably about 4% to 50%.

<Optical System of the Image Display Apparatus 1>

As illustrated in FIGS. 9 to 12, the constitution of the image display apparatus 1A is the same as the constitution of the image display apparatus 1. A difference between the image display apparatus 1A and the image display apparatus 1 is an interval between the image-forming lens 40 and the multiple stacked combiners 50. In addition, like reference numerals will be used for elements having the same functions as in the image display apparatus 1, and descriptions thereof will be omitted. Like reference numerals will also be used for rays that are the same as in FIGS. 1 to 4. Also, the coordinate system of FIGS. 9 to 12 is the same as that in FIGS. 1 to 4. Also, in FIGS. 9 to 12, an angle $\theta_2$ is $\tan^{-1}\{(bg/2ae(h+g))d_0\}$. A distance e is a distance in the x-axis direction from a real image g241 (an aerial real image of a first image) to a contact surface with a line perpendicular to the optical axis of the second combiner 52, and a distance g is a distance in the x-axis direction from a main plane of the second combiner 52 to the virtual image g211 of the second combiner 52 (FIGS. 9 and 12).

The image-forming lens 40 and the second combiner 52 are disposed to be spaced apart by a distance b+e in the x-axis direction. In addition, the real image g241 is formed at a distance b from the image-forming lens 40 in the x-axis direction. Also, a focal length $f_1$ of the image-forming lens 40 satisfies the relationship of Formula (1).

The first combiner 51, the second combiner 52, and the third combiner 53 are disposed at a distance e from the real image g241 in the x-axis direction. In addition, the length of the distance e is equal to or smaller than the focal length $f_2$ of each of the first combiner 51 to the third combiner 53 ($e \leq f_2$). Also, the focal length $f_2$ satisfies a relationship of the following Formula (7) or the following Formula (8).

$$\frac{1}{e} - \frac{1}{g} = \frac{1}{f_2} \quad (7)$$

$$\frac{1}{b+e} + \frac{1}{h} = \frac{1}{f_2} \quad (8)$$

As illustrated in FIG. 9, the ray b5 and the ray b6, which have passed through an upper end point p31 and a lower end point p32 of the real image g241 and are transmitted through the third combiner 53, are incident on the second combiner 52, and images of focal points of the ray b5 and the ray b6 are formed at points p33, p34, p36, and p37 on the second combiner 52.

Also, the second combiner 52 forms the virtual image g211 in a direction of the line perpendicular to the optical axis (line b7). The size of the virtual image g211 in the y-axis direction is $(bg/ae)d_0$. The image of the ray formed at the points p33 and p34 on the second combiner 52 is formed at a point p35 on the virtual image g121, and the image of the ray formed at the points p36 and p37 on the first combiner 51 is formed at a point p38 on the virtual image g121.

The second combiner 52 reflects the virtual image g211 in the optical axis direction of the projector 10. In FIG. 9, a ray b32 and a ray b33 are main rays.

As illustrated in FIG. 10, the ray b5 and the ray b6 that are transmitted through the third combiner 53 and the second combiner 52 are incident on the first combiner 51, and images of focal points of the ray b5 and the ray b6 are formed at points p43, p44, p46, and p47 on the first combiner 51.

Also, the first combiner 51 forms the virtual image g221 inclined at an angle of $+2\theta_1$ with respect to the virtual image g211. The size of the virtual image g221 in the y-axis direction is $(bg/ae)d_0$. Images of rays formed at the points p43 and p44 on the first combiner 51 are formed at a point p45 on the virtual image g221, and images of rays formed at the points p46 and p47 on the first combiner 51 are formed at a point p48 on the virtual image g221.

The first combiner 51 reflects the virtual image g221 upward at an angle of $+2\theta_1$ with respect to the optical axis of the projector 10. In FIG. 10, a ray b42 and a ray b43 are main rays, and a line b41 is a central line of each of the ray b42 and the ray b43.

As illustrated in FIG. 11, the ray b5 and the ray b6 projected from the projector 10 are incident on the third combiner 53, and images of focal points of the ray b5 and the ray b6 are formed at points p53, p54, p56, and p57 on the third combiner 53.

Also, the third combiner 53 forms a virtual image g231 inclined at an angle of $+2\theta_1$ with respect to the virtual image g211. The size of the virtual image g231 in the y-axis direction is $(bg/ae)d_0$. Images of rays formed at the points p53 and p54 on the third combiner 53 are formed at a point p55 on the virtual image g231, and images of rays formed at the points p56 and p57 on the third combiner 53 are formed at a point p58 on the virtual image g231.

The third combiner 53 reflects the virtual image g231 downward at an angle of $-2\theta_1$ with respect to the optical axis (line b7) of the projector 10. In FIG. 11, a ray b52 and a ray b53 are main rays, and a line b51 is a central line of each of the ray b52 and the ray b53.

<Spatial-Image-Forming Iris Surface>

Next, a spatial-image-forming iris surface due to each of the second combiner 52, the first combiner 51, and the third combiner 53 will be described.

First, a spatial-image-forming iris surface due to the second combiner 52 will be described.

As illustrated in FIG. 9, the main ray b32 and the main ray b33 of the virtual image g211 due to the second combiner 52 form an image of the spatial-image-forming iris surface g212 at a distance h from the contact surface with the line perpendicular to the optical axis of the second combiner 52 in the x-axis direction. The size of the spatial-image-forming iris surface g212 in the y-axis direction becomes $\{h/(b+e)\}d_1$ since the lens pupil diameter $d_1$ of the image-forming lens is magnified by a factor of $h/(b+e)$.

When the relationship between the size $\{h/(b+e)\}d_1$ of the spatial-image-forming iris surface g212 and the size $(bg/ae)d_0$ of the display image of the image display apparatus 1A satisfies the following Formula (9), the main ray b32 and the main ray b33 become parallel, and the shape of the viewing area becomes an infinite pentagonal shape.

$$\frac{h}{b+e}d_1 \geq \frac{bg}{ae}d_0 \qquad (9)$$

Also, when the relationship between the size $\{h/(b+e)\}d_1$ of the spatial-image-forming iris surface g212 and the size $(bg/ae)d_0$ of the display image of the image display apparatus 1A satisfies the following Formula (10), the main ray b32 and the main ray b33 become non-parallel, and the shape of the viewing area becomes a diamond shape.

$$\frac{h}{b+e}d_1 < \frac{bg}{ae}d_0 \qquad (10)$$

Next, a spatial-image-forming iris surface due to the first combiner 51 will be described.

As illustrated in FIG. 10, the main ray b12 and the main ray b13 of the virtual image g121 are reflected at an angle of $+2\theta_1$ with respect to the x-axis direction. Thus, the first combiner 51 forms the spatial-image-forming iris surface g222 with a size $\{h/(b+e)\}d_1$ at a distance h from a contact surface with the line perpendicular to the optical axis of the first combiner 51. Like the spatial-image-forming iris surface g212 due to the second combiner 52 (FIG. 9), a viewing area in an infinite pentagonal shape or a diamond shape shown with an area g223 is formed in front of and behind the spatial-image-forming iris surface g222. Also, functions of the spatial-image-forming iris surface g222 and the viewing area are the same as those in the second combiner 52.

Also, a condition for a viewing area g213 of the second combiner 52 illustrated in FIG. 9 and the viewing area g223 of the first combiner 51 illustrated in FIG. 10 to avoid crosstalk without superimposition as illustrated in FIG. 12 is shown in Formula (5) above.

Because the second combiner 52 and the first combiner 51 are tilted and disposed to be spaced apart from each other at the angle $\theta_1$ in Formula (5) or more, crosstalk does not occur between display images.

Next, a spatial-image-forming iris surface due to the third combiner 53 will be described.

As illustrated in FIG. 11, the main ray b52 and the main ray b53 of the virtual image g231 are reflected at an angle of $-2\theta_k$ with respect to the x-axis direction. Thus, the third combiner 53 forms the spatial-image-forming iris surface g232 with the size $\{h/(b+e)\}d_1$ at a distance h from a contact surface with the line perpendicular to the optical axis of the third combiner 53. Like the spatial-image-forming iris surface g212 due to the second combiner 52 (FIG. 9), a viewing area in an infinite pentagonal shape or a diamond shape shown with an area g233 is formed in front of and behind the spatial-image-forming iris surface g232. Also, functions of the spatial-image-forming iris surface g232 and the viewing area are the same as those in the second combiner 52.

Also, a condition for the viewing area g213 of the second combiner 52 illustrated in FIG. 9 and the viewing area g233 of the third combiner 53 illustrated in FIG. 11 to avoid crosstalk without superimposition as illustrated in FIG. 12 is shown in Formula (5) above.

Here, multiple reflection and transmission of light due to the multiple stacked combiners 50 will be described.

For example, when three combiners, the first combiner 51 to the third combiner 53, are present, the second light of $T^4R$ in FIG. 7 displays a second virtual image g221 at the innermost portion, and the second light of $T^2R^3$ in FIG. 7 displays an image at a mirror symmetric position reflected three times by the second combiner 52, the third combiner 53, and the second combiner 52.

Thus, since the second virtual image g221 at the innermost portion (FIG. 10) and the image at the mirror symmetric position reflected three times by the second combiner 52, the third combiner 53, and the second combiner 52 are simultaneously visible and superimposed on each other in the spatial-image-forming iris surface g212 and the viewing area g213 in FIG. 9, crosstalk occurs.

However, like the first embodiment, since only 0.17% of noise components are generated when each of the first combiner 51 to the third combiner 53 has the reflectance of 4% and the transmittance of 96%, the noise components are almost invisible to an observer during the crosstalk.

In addition, the number of combiners may also be two, or four or more in the second embodiment as well.

Also, since a double image due to back reflection is generated when the thickness of the first combiner 51 to the third combiner 53 in the x-axis direction is thick, a moth-eye structure film, which is a film for preventing reflection, or an AR coating is preferably provided at a back surface of each of the first combiner 51 to the third combiner 53 in the second embodiment as well.

As described above, the image display apparatus 1A according to the embodiment is wherein: a projection image of the projector 10 is formed as a first image of a size $d_0$ on an angularly uniform diffusion film (diffusion film 20) or on a normal diffusion film (diffusion film 20); the condensing lens 30 with a focal length $f_0$ is installed to be adhered to the diffusion film; one or a plurality of image-forming lenses 40 with a lens pupil diameter $d_1$ at a synthetic focal length $f_1$: $((1/a)+(1/b)=(1/f_1))$ is installed at a distance $f_0=a$ from the condensing lens; an aerial real image of the first image (the real image g241) is formed at a distance b from a main plane of the image-forming lens with a magnification factor b/a by the image-forming lens; a plurality of transparent concave reflectors each with a focal length $f_2$: $((1/c)+(1/d)=(1/f_2))$ and reflectance of about 4% to 50% (first combiner 51, second combiner 52, and third combiner 53) is stacked at intervals at which the plurality of transparent concave reflectors are able to come into contact with one another by changing angles formed between one another by approximately $\theta 1$: $(\theta 1 \geq (\frac{1}{2})\tan^{-1}(d_1/b+c))$ at a distance c ($c \leq f_2$) from the aerial image having size $(b/a)d_0$; a virtual image of the first image in a size $(bd/ac)d_0$ with a magnification factor bd/ac is formed at a distance d in the back direction of each of the transparent concave reflectors; an aerial image of a lens pupil of the image-forming lens (spatial-image-forming iris surface g212, spatial-image-forming iris surface g222, and spatial-image-forming iris surface g232) in a size $(e/(b+c))d_1$, which has a magnification factor e/(b+c), is formed at a distance e in a direction of a main reflection ray of each of the transparent concave reflectors; and an infinite pentagonal viewing area is formed when $(e/(b+c))d_1 \geq (bd/ac)d_0$ in front of and behind the aerial image of the lens pupil and a diamond-shaped viewing area is formed when $(e/(b+c))d_1 < (bd/ac)d_0$ in front of and behind the aerial image of the lens pupil.

The mark c above refers to the mark e in the second embodiment, the mark d refers to the mark g in the second embodiment, and the mark e refers to the mark h in the second embodiment.

With the constitution above, according to the embodiment, a range in which a display image due to a virtual image is visible can correspond to several people, and bright display images having the same brightness can be displayed to the several people.

In this way, according to the embodiment, since all virtual images of the plurality of combiners are formed in the optical axis direction of the combiners, an observer can view a display image without performing very much adjustment of the lens. Also, according to the embodiment, an image display apparatus that hardly propagates optical energy to positions other than positions of several predetermined observers, thereby having high optical utilization efficiency, high transmittance, and high transparency, may be provided.

As described above, in the image display apparatus 1A according to the embodiment, the projection unit (the projector 10, the diffusion film 20, the condensing lens 30, and the image-forming lens 40) includes the image-forming lens 40 configured to form an image, the second concave reflector (the second combiner 52) is disposed such that a distance from the image-forming lens 40 is larger than a distance from a real image formed by the image-forming lens, the first image (the spatial-image-forming iris surface g222) is an image based on the virtual image g221, and the second image (the spatial-image-forming iris surface g212) is an image based on the virtual image g211.

With the constitution above, according to the embodiment, since all virtual images of the multiple stacked combiners 50 are formed toward the inside of the multiple stacked combiners 50 in the x-axis direction (the traveling direction of an incident ray), an observer may view a display image without performing very much adjustment of the lens.

Also, in the image display apparatus 1A according to the embodiment, the projection unit (the projector 10, the diffusion film 20, the condensing lens 30, and the image-forming lens 40) includes the diffusion film 20 configured to diffuse rays from the projected image and the condensing lens 30 configured to condense the rays diffused by the diffusion film. The image-forming lens 40 may form an image of rays condensed by the condensing lens, a lens pupil diameter of the condensing lens is $d_0$, a lens pupil diameter of the image-forming lens is $d_1$, a distance between the condensing lens and the image-forming lens is a, a distance in the optical axis direction between the image-forming lens and a real image formed by the image-forming lens is b, a distance in the optical axis direction between any one of the plurality of concave reflectors (the first combiner 51 to the third combiner 53) and the real image g241 or a distance in the optical axis direction between a position between the plurality of concave reflectors and the real image is e, the focal length $f_1$ of the image-forming lens satisfies the relational expression $\{(1/a)+(1/b)=(1/f_1)\}$, the first image and the second image (e.g., the spatial-image-forming iris surface g112, the spatial-image-forming iris surface g122) are formed at a distance h from any one of the plurality of concave reflectors or a distance h from a position between the plurality of concave reflectors in traveling directions of reflected rays from the first concave reflector (the first combiner 51) and the second concave reflector (the second combiner 52), respectively, a distance between the virtual image g211 due to the second concave reflector and the second concave reflector is g, the focal length $f_2$ of each of the first concave reflector and the second concave reflector satisfies the relational expression $[\{(1/e)-(1/g)\}=(1/f_2)]$, and satisfies the relational expression $[\{1/(b+e)\}+(1/h)=(1/f_2)]$, and a size of each of the first image and the second image is $\{h/(b+e)\}d_1$.

With the constitution above, according to the embodiment, like the first embodiment, the image display apparatus using two combiners can provide display images more similar in brightness compared to the related art to two observers and can realize an excellent characteristic in which optical energy is hardly propagated in directions other than directions of the two observers. Also, the image display apparatus 1A using the multiple stacked combiners 50 including three combiners can provide display images more similar in brightness compared to the related art to three observers and can realize an excellent characteristic in which optical energy is hardly propagated in directions other than directions of the three observers.

That is, according to the embodiment, when n combiners are present, the image display apparatus can provide display images more similar in brightness compared to the related art to n observers and can realize an excellent characteristic in which optical energy is hardly propagated in directions other than directions of the n observers.

Also, in the image display apparatus 1A according to the embodiment, the angle $\theta_1$ between a contact surface with the optical axis of the first concave reflector (e.g., the first combiner 51) and a contact surface with the optical axis of the second concave reflector (e.g., the second combiner 52) satisfies the relational expression $\{|\theta_1|\geq 1/2)\tan^{-1}(d_1/(b+e))\}$.

With the constitution above, according to the embodiment, a superimposition between the spatial-image-forming iris surface g222 due to the first combiner 51 and the spatial-image-forming iris surface g212 due to the second combiner 52 can be prevented. As a result, according to the embodiment, two observers can view the same display image without a superimposition between the display images.

Also, in the image display apparatus 1A according to the embodiment, an infinite pentagonal viewing area is formed when $\{h/(b+e)\}d_1\{(bg/ae)d_0\}$ and a hexagonal viewing area is formed when $\{h/(b+e)\}d_1<\{(bg/ae)d_0\}$ in front of and behind the first image (e.g., the spatial-image-forming iris surface g212) and the second image (e.g., the spatial-image-forming iris surface g222).

With the constitution above, according to the embodiment, an infinite pentagonal viewing area can be formed or a hexagonal viewing area may be formed depending on a range in the optical axis direction of an area desired to be viewed by an observer. When the infinite pentagonal viewing area is formed, a display image can be visible to a driver and a fellow passenger in a back seat of a vehicle. In addition, when the diamond-shaped viewing area is formed, a display image visible only to the driver and invisible to the fellow passenger in the back seat of the vehicle can be displayed.

Third Embodiment

Examples in which the first combiner 51 to the third combiner 53 are transparent concave reflectors have been described in the first embodiment and the second embodiment.

In the third embodiment, an example in which, for example, black is painted or deposited on a front surface or a back surface of the first combiner 51 disposed at the innermost portion will be described.

First, an example in which black is painted or deposited on a surface or a back surface of the first combiner 51 disposed at the innermost portion of the image display apparatus 1 according to the first embodiment will be described.

Figure 13:
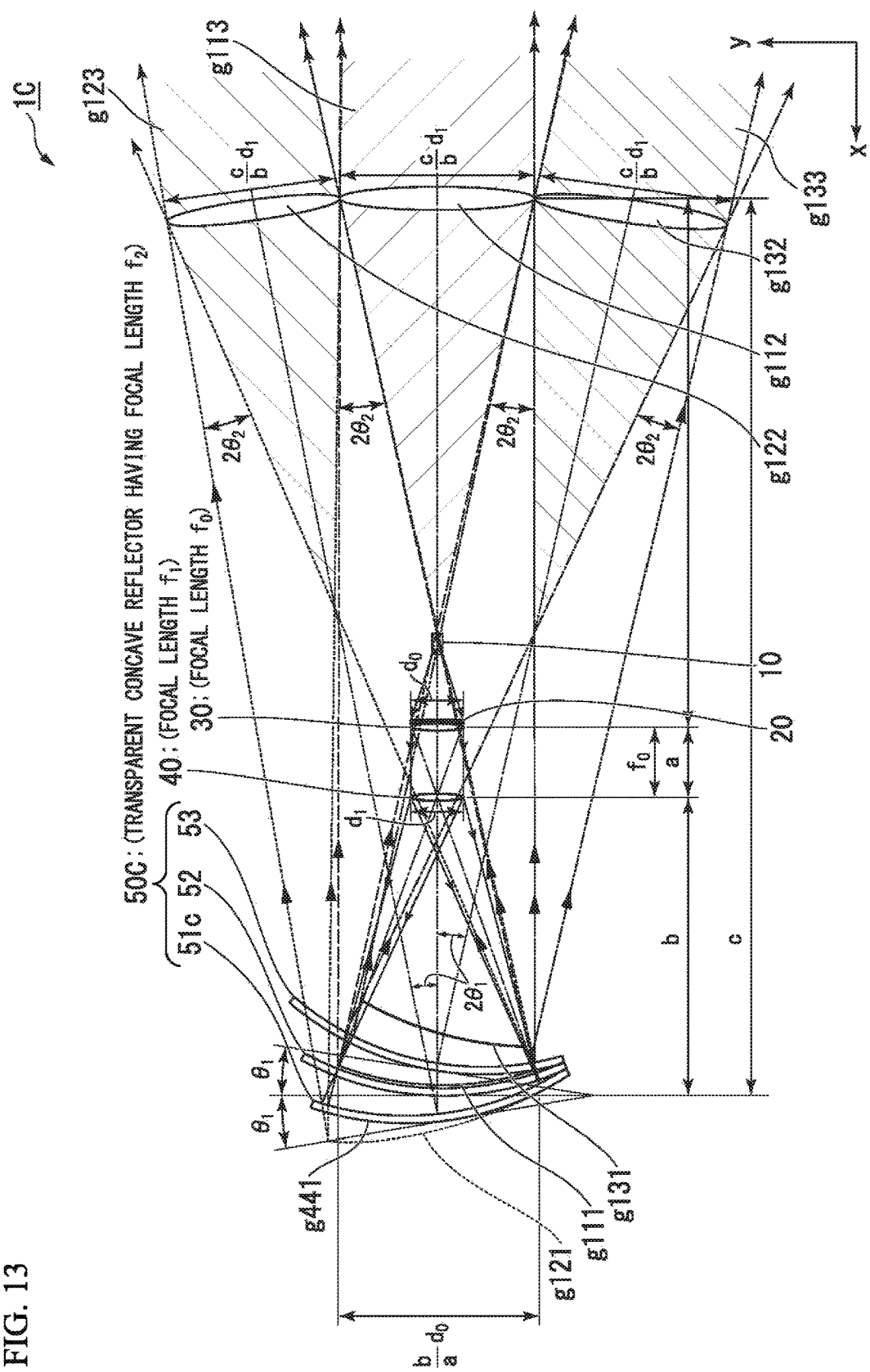
FIG. 13 is a view illustrating a constitution of an image display apparatus 1C, a spatial-image-forming iris surface due to a first combiner, a spatial-image-forming iris surface due to a second combiner, and a spatial-image-forming iris surface due to a third combiner according to a third embodiment.

FIG. 13 is a view illustrating a constitution of an image display apparatus 1C, the spatial-image-forming iris surface g112 due to the second combiner 52, the spatial-image-forming iris surface g122 due to the first combiner 51, and the spatial-image-forming iris surface g132 due to the third combiner 53 according to the embodiment. In addition, although an example in which the viewing area is in an infinite pentagonal shape is illustrated in FIG. 13, the viewing area may also be diamond-shaped. Also, the coordinate system of FIG. 13 is the same as that in FIGS. 1 to 4.

<Constitution of the Image Display Apparatus 1C>

As illustrated in FIG. 13, the image display apparatus 1C includes the projector 10 (projection unit), the diffusion film 20 (projection unit), the condensing lens 30 (projection unit), the image-forming lens 40 (projection unit), and multiple stacked combiners 50C. Also, the multiple stacked combiners 50C include a first combiner 51c (black concave reflector), the second combiner 52 (transparent concave reflector), and the third combiner 53 (transparent concave reflector). In addition, like reference numerals are used for elements having the same functions as in the image display apparatus 1, and descriptions thereof are omitted. In addition, as illustrated in FIG. 13, each of the first combiner 51c, the second combiner 52, and the third combiner 53 has a concave surface facing the projector 10.

<Optical System of the Image Display Apparatus 1C>

Each of the second combiner 52 and the third combiner 53 is a transparent concave reflector formed of transparent acryl or transparent glass. The first combiner 51c is a concave reflector, and, for example, black is painted or deposited on a back surface g441 thereof. In an embodiment, the concave reflector including a black surface at a surface or a back surface thereof is referred to as a black concave reflector.

Next, an example in which a back surface g541 of the first combiner 51 disposed at the innermost portion in the image display apparatus 1A according to the second embodiment is painted black will be described using FIG. 14.

Figure 14:
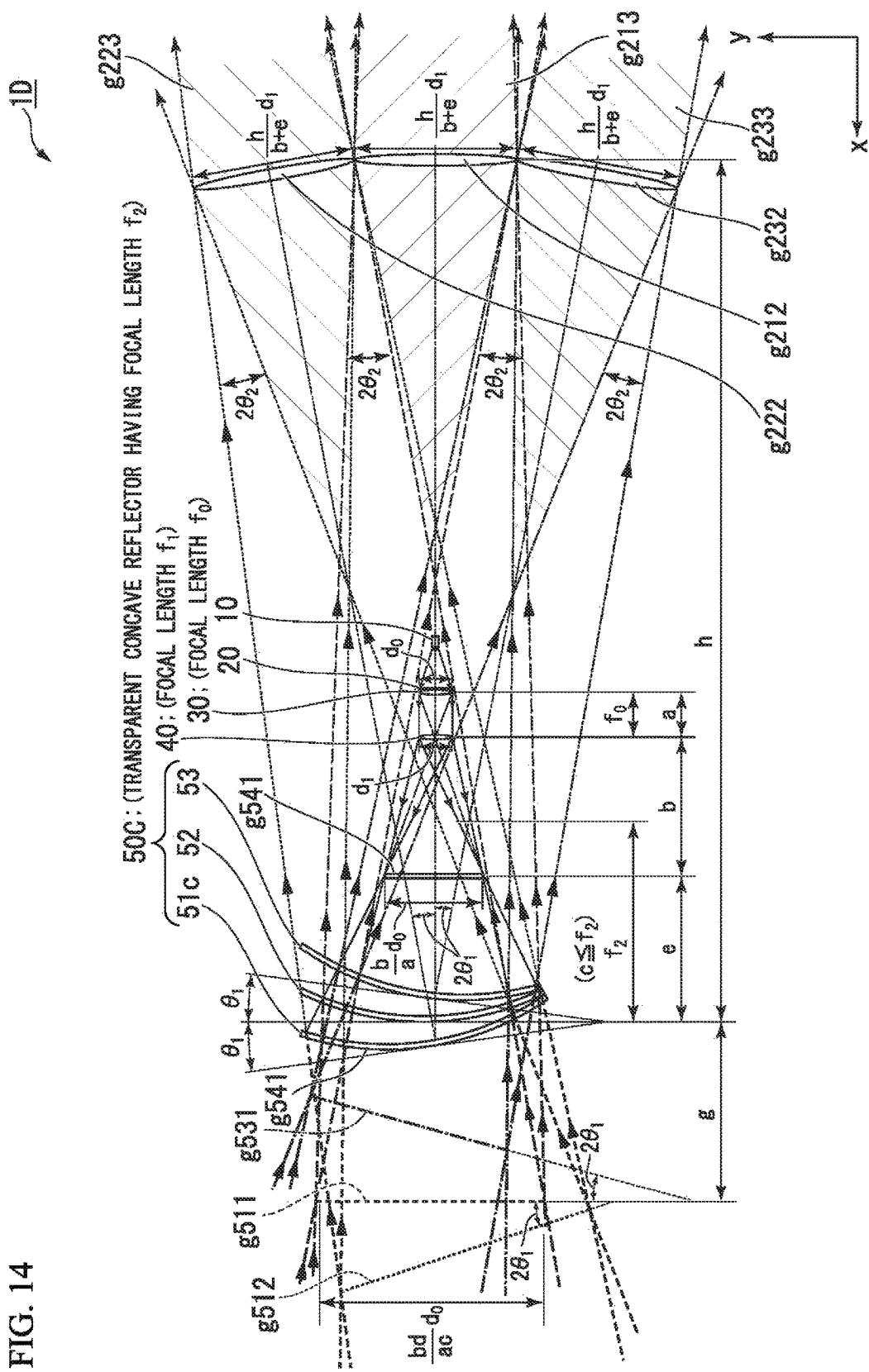
FIG. 14 is a view illustrating a constitution of an image display apparatus 1D, a spatial-image-forming iris surface due to a first combiner, a spatial-image-forming iris surface due to a second combiner, and a spatial-image-forming iris surface due to a third combiner according to the third embodiment.

FIG. 14 is a view illustrating a constitution of an image display apparatus 1D, the spatial-image-forming iris surface g212 due to the second combiner 52, the spatial-image-forming iris surface g222 due to the first combiner 51c, and the spatial-image-forming iris surface g232 due to the third combiner 53 according to the embodiment. In addition, although an example in which the viewing area is diamond-shaped is illustrated in FIG. 14, the viewing angle may also be in an infinite pentagonal shape. Also, the coordinate system of FIG. 14 is the same as that in FIGS. 1 to 4.

<Constitution of the Image Display Apparatus 1D>

As illustrated in FIG. 14, the image display apparatus 1D includes the projector 10 (projection unit), the diffusion film 20 (projection unit), the condensing lens 30 (projection unit), the image-forming lens 40 (projection unit), and the multiple stacked combiners 50C. Also, the multiple stacked combiners 50C include the first combiner 51c (black concave reflector), the second combiner 52 (transparent concave reflector), and the third combiner 53 (transparent concave reflector). In addition, like reference numerals are used for elements having the same functions as in the image display apparatus 1, and descriptions thereof are omitted.

<Optical System of the Image Display Apparatus 1D>

Each of the second combiner 52 and the third combiner 53 is a transparent concave reflector formed of transparent acryl or transparent glass. The first combiner 51c is a black concave reflector. In addition, as illustrated in FIG. 14, each of the first combiner 51c, the second combiner 52, and the third combiner 53 has a concave surface facing the projector 10.

As described above, a back surface of the first concave reflector (e.g., the first combiner 51c) is black in the image display apparatus (1C or 1D) according to the embodiment.

With the configuration above, according to the embodiment, since the first combiner 51c at a rearmost surface among n combiners is a black concave reflector, an image projected from the projector 10 is projected on a black background. As a result, according to the embodiment, contrast of a display image displayed by the multiple stacked combiners 50C may be improved.

Fourth Embodiment

Although examples in which the projector 10 is used to project an image of driving information and the like have been described in the first embodiment to the third embodiment, a device configured to project an image is not limited to the projector 10.

In the embodiment, an example in which a liquid crystal panel is used to project an image will be described. Although an example of applying a liquid crystal panel to the image display apparatus 1 according to the first embodiment will be described, the liquid crystal panel may also be applied to the image display apparatus 1A according to the second embodiment and the image display apparatuses 1C and 1D according to the third embodiment.

Figure 15:
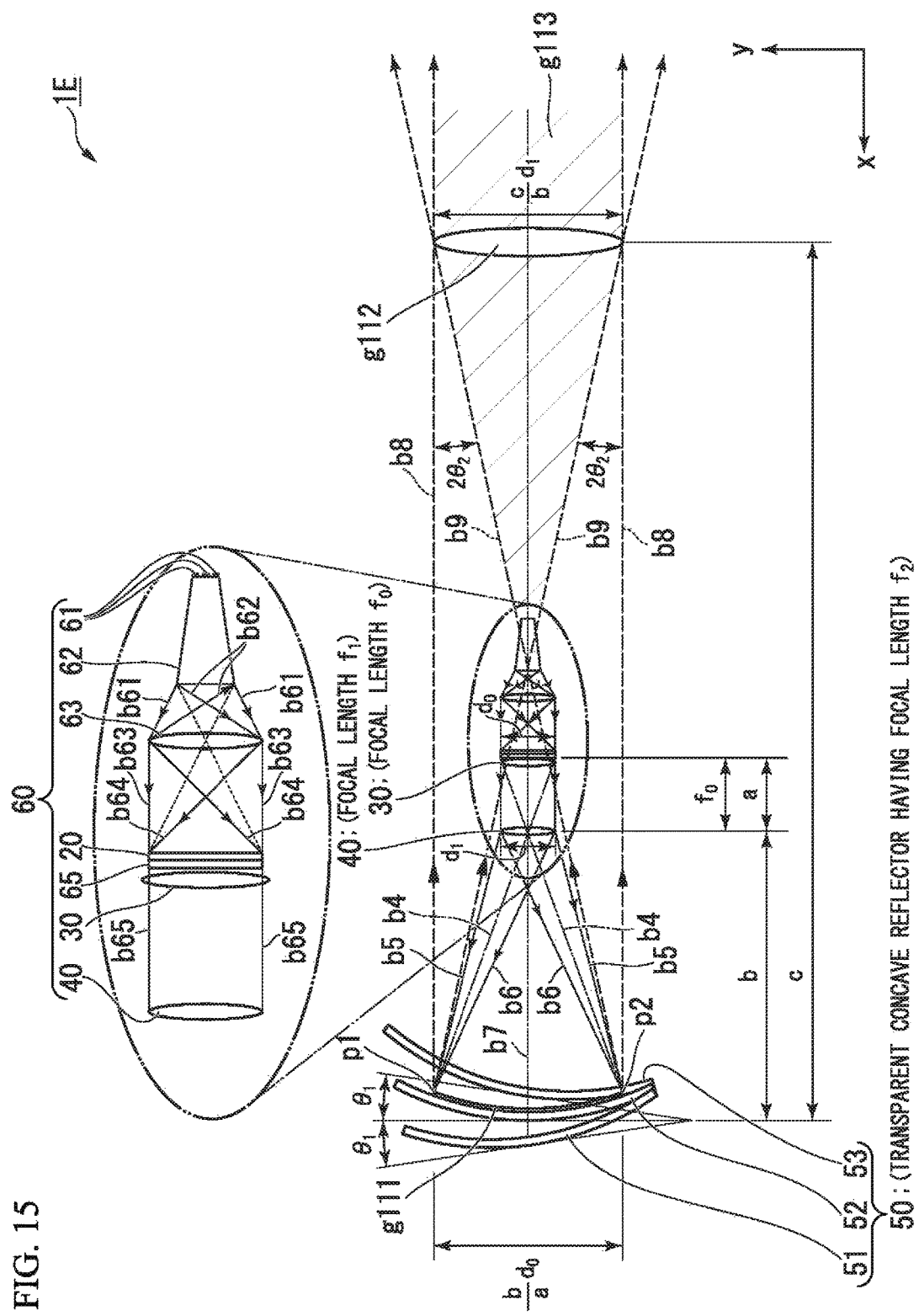
FIG. 15 is a view illustrating a constitution of an image display apparatus and a spatial-image-forming iris surface due to a real image of a first combiner according to a fourth embodiment.
Figure 16:
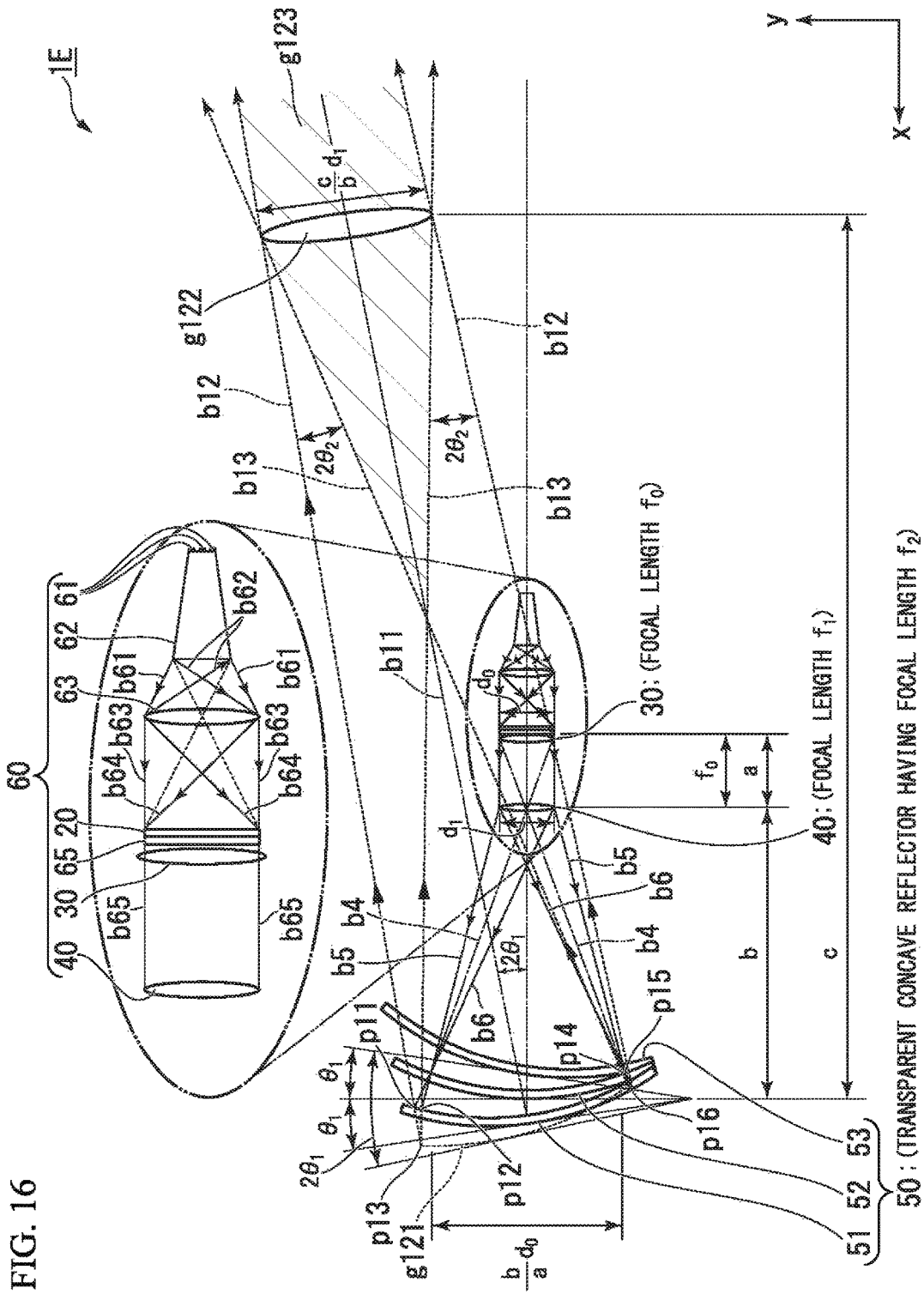
FIG. 16 is a view illustrating the constitution of the image display apparatus and a spatial-image-forming iris surface due to a virtual image of a second combiner according to the fourth embodiment.
Figure 17:
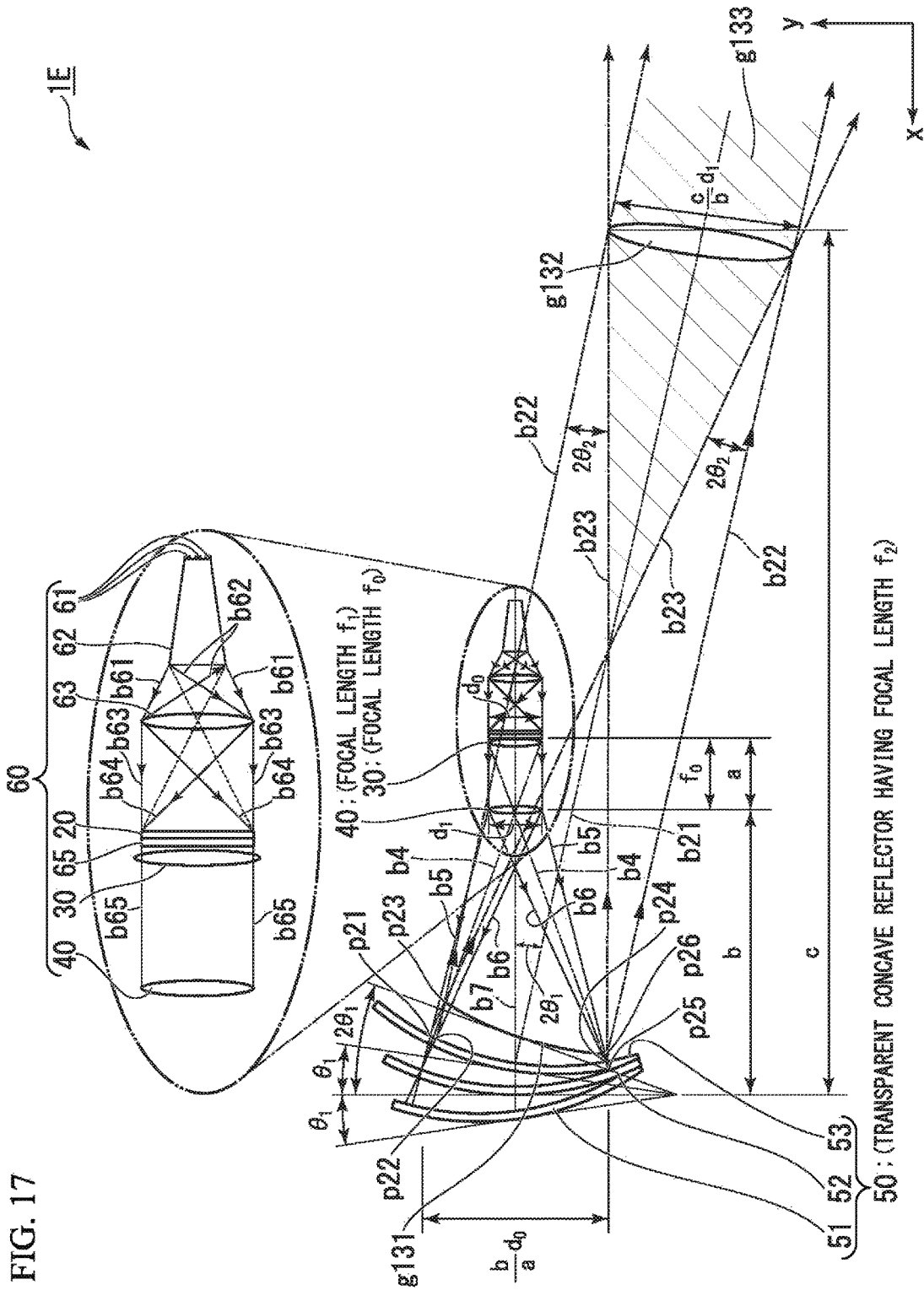
FIG. 17 is a view illustrating the constitution of the image display apparatus and a spatial-image-forming iris surface due to an aerial image of a third combiner according to the fourth embodiment.

FIG. 15 is a view illustrating a constitution of an image display apparatus 1E and the spatial-image-forming iris surface g112 due to the real image g111 of the second combiner 52 according to the embodiment. FIG. 16 is a view illustrating the constitution of the image display apparatus 1E and the spatial-image-forming iris surface g122 due to the virtual image g121 of the first combiner 51 according to the embodiment. FIG. 17 is a view illustrating the constitution of the image display apparatus 1E and the spatial-image-forming iris surface g132 due to the aerial image g131 of the third combiner 53 according to the embodiment.

Figure 18:
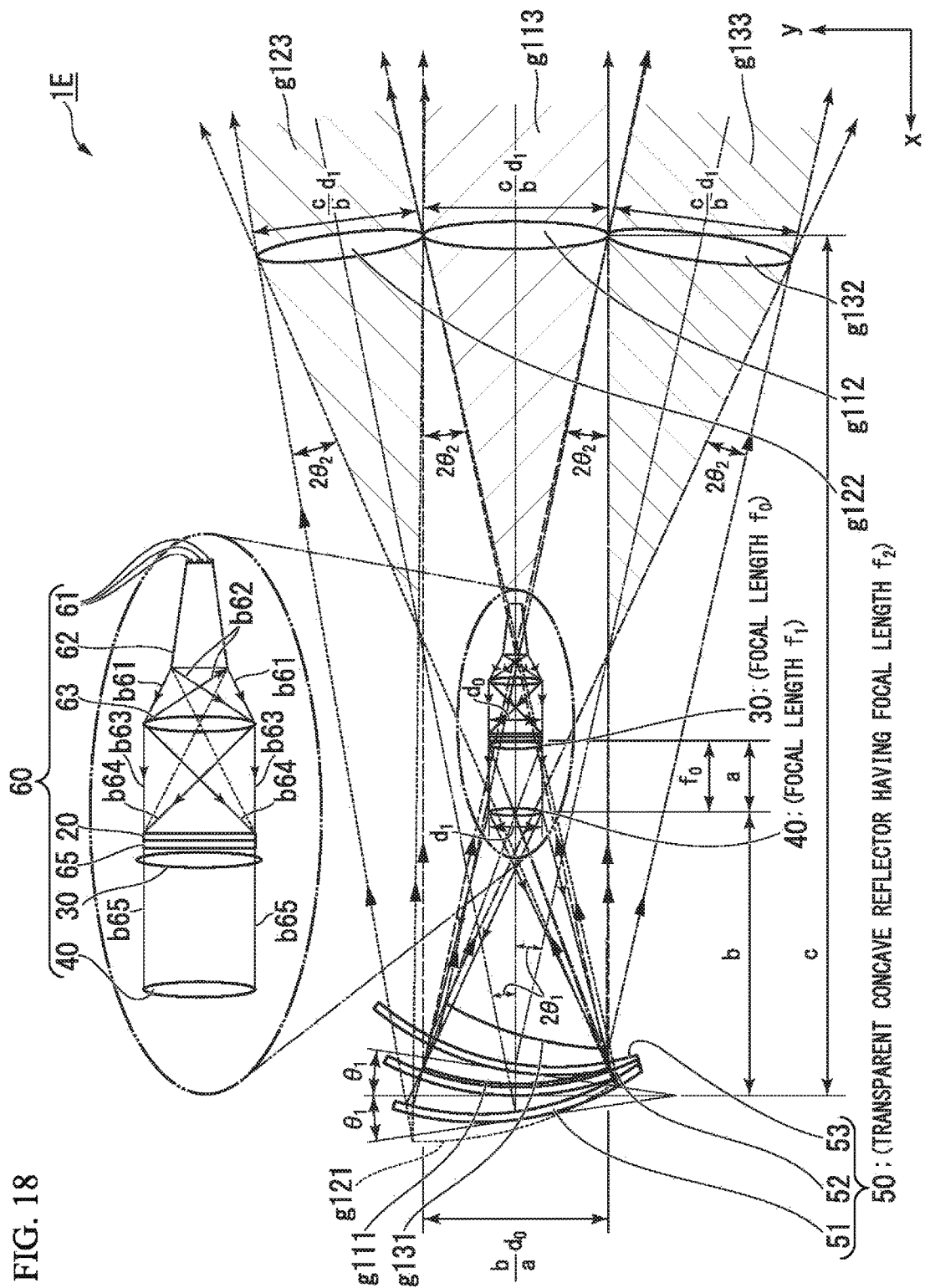

FIG. 18 is a view in which FIGS. 15 to 17 are synthesized. In addition, although an example in which the viewing area is in an infinite pentagonal shape is illustrated in FIGS. 15 to 18, the viewing area may also be diamond-shaped. In addition, like reference numerals will be used for elements having the same functions as in the image display apparatus 1, and descriptions thereof will be omitted. Like reference numerals will also be used for rays that are the same as in FIGS. 1 to 4. Also, the coordinate system of FIGS. 15 to 18 is the same as that in FIGS. 1 to 4.

<Constitution of the Image Display Apparatus 1E>

As illustrated in FIGS. 15 to 18, the image display apparatus 1E includes a projection unit 60 and the multiple stacked combiners 50. Also, the multiple stacked combiners 50 include the first combiner 51 (transparent concave reflector), the second combiner 52 (transparent concave reflector), and the third combiner 53 (transparent concave reflector). That is, a difference between the image display apparatus 1E and the image display apparatus 1 is the projection unit 60.

The projection unit 60 includes a LED 61, a tapered rod-like integrator 62, a lamp optical system lens 63, the diffusion film 20, a liquid crystal panel 65, the condensing lens 30, and the image-forming lens 40. Also, the line b7 represents an optical axis of the projection unit 60.

In the projection unit 60, the LED 61, the tapered rod-like integrator 62, the lamp optical system lens 63, the diffusion film 20, the liquid crystal panel 65, the condensing lens 30, and the image-forming lens 40 are disposed in that order along the optical axis (line b7).

Also, the liquid crystal panel 65 is adhered to the diffusion film 20 in the x-axis direction.

In addition, each of the tapered rod-like integrator 62, the lamp optical system lens 63, the condensing lens 30, and the image-forming lens 40 is disposed to be aligned with the optical axis (line b7).

<Optical System of the Image Display Apparatus 1E>

The LED 61 includes three LEDs of red, blue, and green, for example. An image output device (not illustrated) is connected to the LED 61. The LED 61 projects an image output by the image output device to the diffusion film 20 through the tapered rod-like integrator 62 and the lamp optical system lens 63. A ray b61 and a ray b62 represent rays of an image output from the tapered rod-like integrator 62.

The tapered rod-like integrator 62 is a homogenizer configured to improve positional (spatial) uniformity. In addition, the homogenizer improves uniformity of optical intensity.

The tapered rod-like integrator 62 improves positional uniformity of intensity distribution of rays output from the LED 61 and forms a spatially uniform optical surface on an output surface of the tapered rod-like integrator. The tapered rod-like integrator 62 outputs rays with improved positional uniformity of intensity distribution to the lamp optical system lens 63.

The lamp optical system lens 63 is a two-sided convex lens having a number of apertures NA. According to the Etendue conservation law, light from the LED 61 is restricted due to spread of range belonging to the number of apertures NA of the lamp optical system lens 63. In this way, the lamp optical system lens 63 improves optical utilization efficiency of the ray b61 and the ray b62 incident from the tapered rod-like integrator 62 and forms an image of the spatially uniform optical surface on the diffusion film 20. As a result, an optical surface that is angularly and spatially uniform is realized at an output surface of the diffusion film 20. In addition, a ray b63 and a ray b64 represent rays of an image output from the lamp optical system lens 63.

The diffusion film 20 serves as a backlight of the liquid crystal panel 65. When the output surface of the diffusion film 20 is used as the backlight of the liquid crystal panel 65, scintillation of a display image surface is reduced and image quality is improved because a surface of the diffusion film 20 and an image display surface of the liquid crystal panel are detached. Here, scintillation is a phenomenon in which a fine change occurs in luminance. In some cases, the scintillation occurs due to a magnified image of the diffusion film 20 being displayed as a display image.

The liquid crystal panel 65 outputs rays of an image incident from the diffusion film 20 to the condensing lens 30.

The condensing lens 30 allows rays of an image output from the liquid crystal panel 65 to be deflected and incident on a lens pupil of the image-forming lens 40.

As illustrated in FIGS. 15 and 18, the real image g111 is formed by the second combiner 52. In addition, the spatial-image-forming iris surface g112 and the viewing area g113 are formed by the real image g111.

As illustrated in FIGS. 16 and 18, the virtual image g121 is formed by the first combiner 51. In addition, the spatial-image-forming iris surface g122 and the viewing area g123 are formed by the virtual image g121.

As illustrated in FIGS. 17 and 18, the aerial image g131 is formed by the third combiner 53. In addition, the spatial-image-forming iris surface g132 and the viewing area g133 are formed by the aerial image g131.

As described above, according to the embodiment, an image is not formed on the diffusion film 20. Instead, the diffusion film 20 is used as the backlight of the liquid crystal panel 65. The tapered rod-like integrator 62, the lamp optical system lens 63, and the diffusion film 20 form an optical surface that is angularly and spatially uniform. In addition, by forming a display image using the liquid crystal panel 65 slightly spaced apart from the angularly and spatially uniform optical surface, a state in which the diffusion film 20 is not on an optical surface viewed by a human may be generated. In this way, according to the embodiment, the scintillation can be reduced by being attenuated.

As described above, in the image display apparatuses 1, 1A, 1C, 1D, and 1E according to respective embodiments, the projection unit includes at least one of the projector 10 (FIGS. 1 to 4, FIGS. 8 to 14), or a combination of the liquid crystal panel 65 and the lens (the lamp optical system lens 63).

When the projection unit 60 includes the liquid crystal panel 65 and the lamp optical system lens 63, by using an angularly and spatially uniform optical surface formed by the diffusion film 20 as the backlight of the liquid crystal panel 65, scintillation of the display image surface is reduced and image quality is improved because a surface of the diffusion film 20 and an image display surface of the liquid crystal panel are detached.

First Modified Example of the First Embodiment to the Fourth Embodiment

In the first embodiment to the fourth embodiment, although a case in which an absolute value of the angle +$\theta_1$ (first angle) between a contact surface with the line perpendicular to the optical axis of the first combiner 51 and a contact surface with the line perpendicular to the optical axis of the second combiner 52 is equal to an absolute value of the angle −$\theta_1$ (second angle) between a contact surface with the line perpendicular to the optical axis of the third combiner 53 and the contact surface with the line perpendicular to the optical axis of the second combiner 52, the absolute value of the first angle and the absolute value of the second angle may also be different.

In the modified embodiment, an example in which the absolute value of the first angle and the absolute value of the second angle are different will be described. In addition, although the image display apparatus 1 according to the first embodiment is described below, the absolute value of the first angle and the absolute value of the second angle may also be different in the image display apparatus 1A according to the second embodiment, the image display apparatuses 1C and 1D according to the third embodiment, and the image display apparatus 1E according to the fourth embodiment.

Figure 19:
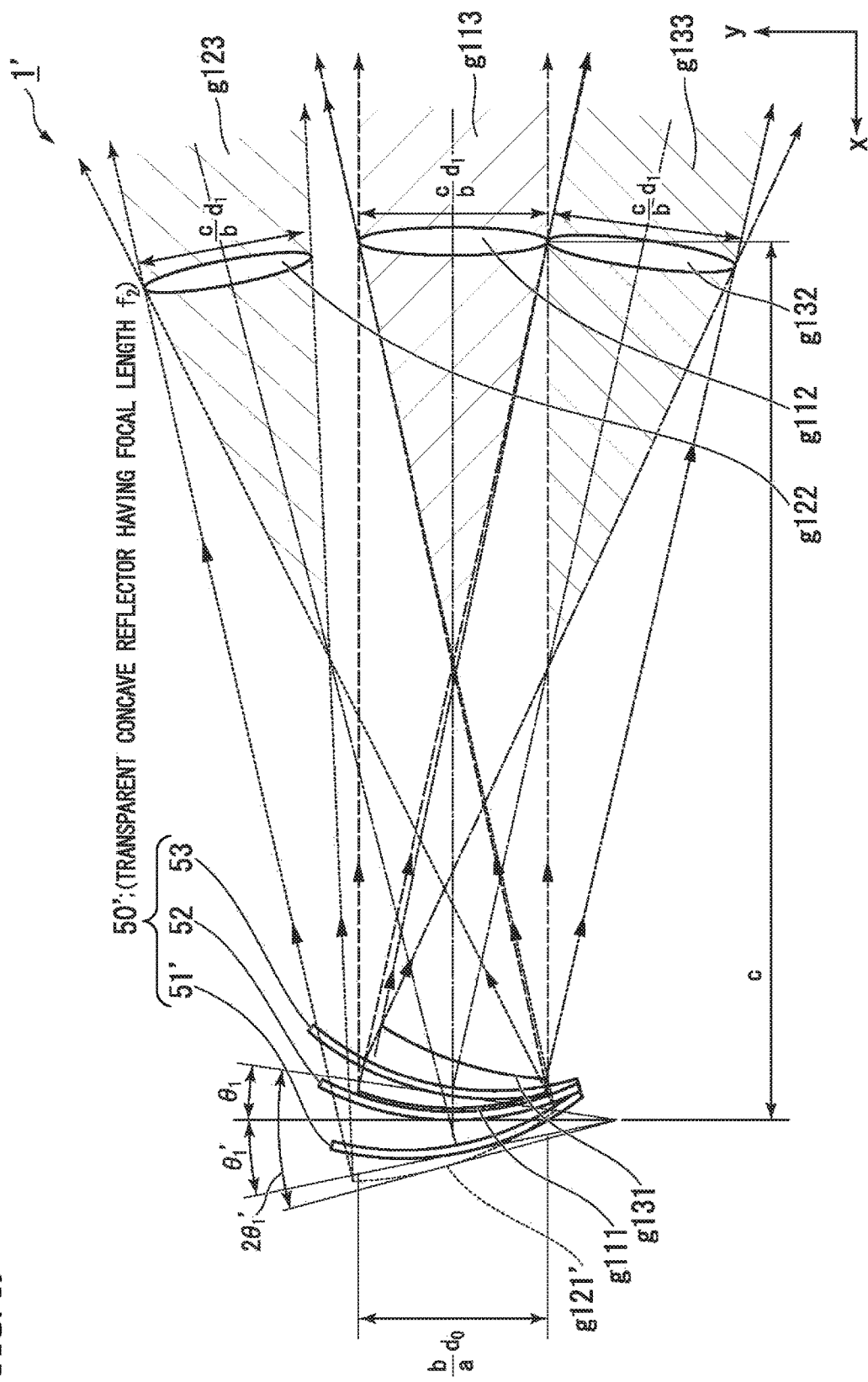
FIG. 19 is a view illustrating a constitution of an image display apparatus, a spatial-image-forming iris surface due to a first combiner, a spatial-image-forming iris surface due to a second combiner, and a spatial-image-forming iris surface due to a third combiner according to a first modified example of the first embodiment.

FIG. 19 is a view illustrating a constitution of an image display apparatus 1', the spatial-image-forming iris surface g112 due to the second combiner 52, the spatial-image-forming iris surface g122 due to a first combiner 51', and the spatial-image-forming iris surface g132 due to the third combiner 53 according to the first modified example of the first embodiment. In addition, like reference numerals will be used for elements having the same functions as in the image display apparatus 1, and descriptions thereof will be omitted. Also, the coordinate system of FIG. 19 is the same as that in FIGS. 1 to 4. Also, in FIG. 19, although the projection unit (the projector 10, the diffusion film 20, the condensing lens 30, and the image-forming lens 40) illustrated in FIGS. 1 to 4 is omitted, the image display apparatus 1' includes the projection unit, like the image display apparatus 1.

The image display apparatus 1' includes the projector 10 (not illustrated), the diffusion film 20 (not illustrated), the condensing lens 30 (not illustrated), the image-forming lens 40 (not illustrated), and multiple stacked combiners 50'. Also, the multiple stacked combiners 50' include the first combiner 51' (transparent concave reflector), the second combiner 52 (transparent concave reflector), and the third combiner 53 (transparent concave reflector).

Lower ends of the first combiner 51', the second combiner 52, and the third combiner 53 are adhered to one another. Also, a contact surface with a line perpendicular to an optical axis of the first combiner 51' is disposed to form an angle $+\theta_1'$ with a contact surface with a line perpendicular to an optical axis of the second combiner 52. In addition, a contact surface with a line perpendicular to the optical axis of the third combiner 53 is disposed to form an angle $-\theta_1$ with the contact surface with the line perpendicular to the optical axis of the second combiner 52.

A ray that is transmitted through the third combiner 53 and the second combiner 52 is incident on the first combiner 51' to form an image of a focal point of the ray on the first combiner 51'. Also, the first combiner 51' forms a virtual image g121' inclined at an angle of $+2\theta_1'$ in a traveling direction of an incident ray with respect to the second combiner 52. The image of the ray formed on the first combiner 51' is formed on the virtual image g121'. The first combiner 51' reflects the virtual image g121' upward at an angle of $+2\theta_1'$ with respect to the optical axis (line b7) of the projector 10 (FIG. 4).

In this way, as illustrated in FIG. 19, the spatial-image-forming iris surface g122 may be formed at a different position from FIG. 1 and FIG. 4. Also, as illustrated in FIG. 19, the spatial-image-forming iris surface g122 may be formed at a position spaced apart from the spatial-image-forming iris surface g112.

As described above, in the image display apparatus 1' according to the embodiment, the number of the plurality of concave reflectors (e.g., the first combiner 51', the second combiner 52, and the third combiner 53) are three or more, a third concave reflector of the plurality of concave reflectors (the third combiner 53) is disposed between the projection unit and the first concave reflector (the first combiner 51') and reflects a portion of an image projected by the projection unit to form a third aerial image based on the image (the spatial-image-forming iris surface g132), the second concave reflector (the second combiner 52) is disposed between the first concave reflector and the third concave reflector, and a first difference ($-\theta_1$) between a first angle (0°) of a contact surface with the optical axis (line b7) of the first concave reflector with respect to a line perpendicular to the optical axis and a second angle ($\theta1$) of a contact surface with the optical axis of the second concave reflector with respect to a line perpendicular to the optical axis is different from a second difference ($-\theta_1'$) between the second angle and a third angle ($\theta_1'$) of a contact surface with the optical axis of the third concave reflector with respect to a line perpendicular to the optical axis.

With the configuration above, according to the embodiment, angles and intervals in the y-axis direction in which spatial-image-forming iris surfaces are formed depending on a position of a driver, a navigator, and an observer in the back seat may be adjusted for each combiner.

Second Modified Example of the First Embodiment to the Fourth Embodiment

Since the plurality of stacked combiners all have the same focal length according to the first embodiment to the fourth embodiment and the first modified example of the first embodiment to the fourth embodiment, distances from the image display apparatuses 1, 1A, 1C, 1D, 1E, and 1' to positions at which an image is visible are set to be substantially the same from all combiners.

In the embodiment, an example in which distances from an image display apparatus 1" to a position at which an image is visible differ from each other will be described.

Figure 20:
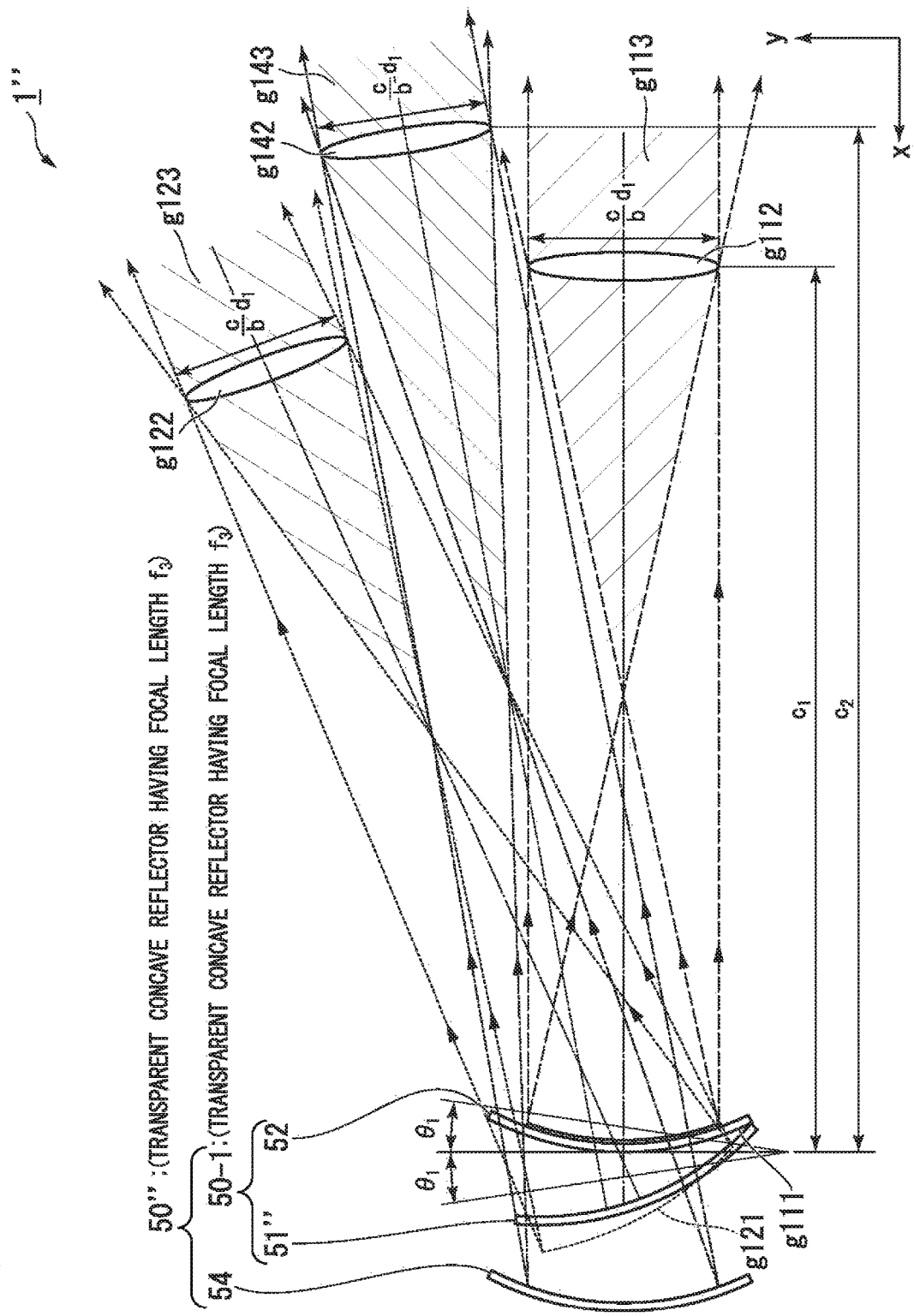
FIG. 20 is a view illustrating a constitution of an image display apparatus, a spatial-image-forming iris surface due to a first combiner, a spatial-image-forming iris surface due to a second combiner, and a spatial-image-forming iris surface due to a fourth combiner according to a second modified example of the first embodiment.

FIG. 20 is a view illustrating a constitution of the image display apparatus 1", the spatial-image-forming iris surface g112 due to the second combiner 52, the spatial-image-forming iris surface g122 due to the first combiner 51, and a spatial-image-forming iris surface g142 due to a fourth combiner 54 according to the second modified example of the first embodiment. In addition, like reference numerals will be used for elements having the same functions as in the image display apparatus 1, and descriptions thereof will be omitted. Also, the coordinate system of FIG. 20 is the same as that in FIGS. 1 to 4. Also, although the projection unit (the projector 10, the diffusion film 20, the condensing lens 30, and the image-forming lens 40) illustrated in FIGS. 1 to 4 is omitted in FIG. 20, the image display apparatus 1" includes the projection unit, like the image display apparatus 1.

The image display apparatus 1" includes the projector 10 (not illustrated), the diffusion film 20 (not illustrated), the condensing lens 30 (not illustrated), the image-forming lens 40 (not illustrated), and multiple stacked combiners 50". Also, the multiple stacked combiners 50" include the first combiner 51 (transparent concave reflector), the second combiner 52 (transparent concave reflector), and the fourth combiner 54 (transparent concave reflector).

Lower ends of the first combiner 51 and the second combiner 52 are adhered to each another. Also, a contact surface with a line perpendicular to an optical axis of the first combiner 51 is disposed to form an angle larger than $+\theta_1'$ with respect to a contact surface with a line perpendicular to an optical axis of the second combiner 52. The focal length of each of the second combiner 52 and the first combiner 51 is $f_2$.

The fourth combiner 54 is disposed in a traveling direction of an incident ray on the first combiner 51. The fourth combiner 54 is a transparent concave reflector formed of transparent acryl or transparent glass.

The fourth combiner 54 has a concave surface facing the projector 10. The fourth combiner 54 has reflectance of 4 to 8%, for example, a focal length $f_3$ that differs from the focal length $f_2$, and transmittance of 92 to 96%, for example. The focal length $f_3$ is, for example, larger than the focal length $f_2$.

As illustrated in FIG. 20, the spatial-image-forming iris surface g112 due to the second combiner 52 is formed at a distance $c_1$ from the contact surface with the line perpendicular to the optical axis of the second combiner 52 in the x-axis direction. Also, the spatial-image-forming iris surface g142 due to the fourth combiner 54 is formed at a distance $c_2$ from the contact surface with the line perpendicular to the optical axis of the second combiner 52 in the x-axis direction. In addition, the distance $c_2$ is larger than the distance $c_1$.

In addition, the multiple stacked combiners 50" illustrated in FIG. 20 are merely an example and are not limited thereto.

For example, when corresponding to three observers in the back seat, in addition to a driver and a fellow passenger sitting in the passenger seat, the multiple stacked combiners 50" may include five stacked combiners. In this case, two of the five combiners of the multiple stacked combiners 50" may be set to have a focal length at which a spatial-image-forming iris surface corresponding to the driver and the fellow passenger sitting in the passenger seat is formed, and three of the five combiners may be set to have a focal length at which a spatial-image-forming iris surface corresponding to the back seat is formed.

In addition, in a case in which the image display apparatus 1" is installed at an upper portion of a windshield of a vehicle to project light from a ceiling, when two people, three people, and three people are seating in three rows of seats, as in a van-type vehicle, eight combiners are stacked, and the eight combiners are arranged in groups of two combiners, three combiners, and three combiners. In addition, the groups of two combiners, three combiners, and three combiners may be set to have three types of focal lengths different from one another.

As described above, in the image display apparatus 1" according to the embodiment, the plurality of concave reflectors (e.g., the first combiner 51, the second combiner 52, and the fourth combiner 54) have focal lengths differing from one another.

With the configuration above, since the focal lengths of the plurality of stacked combiners are different according to the embodiment, distances from the image display apparatus 1" to positions at which an observer views an image may differ from one another. In this way, the embodiment is effective when, for example, multiple passengers are present in a vehicle, and the number of rows of back seats increase toward the rear.

In addition, although an example in which the spatial-image-forming iris surfaces do not overlap has been described according to the first embodiment to the fourth embodiment, the first modified example of the first embodiment to the fourth embodiment, and the second modified example of the first embodiment to the fourth embodiment, embodiments are not limited thereto. Depending on purpose, when it is acceptable for corners of spatial-image-forming iris surfaces to overlap somewhat, the angle $\theta_1$ between combiners may be less than $\frac{1}{2}\{\tan^{-1}(d_1/b)\}$ in the first embodiment, for example, and the absolute value of the angle between combiners, $|\theta_1|$, may be less than $\frac{1}{2}\{\tan^{-1}(d_1/(b+e))\}$ in the second embodiment.

In addition, although examples in which the image display apparatuses 1, 1A, 1C, 1D, 1E, 1', and 1" are mounted in a vehicle have been described according to the first embodiment to the fourth embodiment, the first modified example of the first embodiment to the fourth embodiment, and the second modified example of the first embodiment to the fourth embodiment, embodiments are not limited thereto. The image display apparatuses 1, 1A, 1C, 1D, 1E, 1', and 1" may also be applied to those other than a vehicle. In this case, an image projected from the projection unit 60 including the projector 10 or the liquid crystal panel 65 is not limited to driver information and may be an image corresponding to an apparatus to which the image display apparatuses 1, 1A, 1C, 1D, 1E, 1', and 1" are applied.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image display apparatus, wherein:
a projection image of a projector is formed as a first image of size $d_0$ on an angularly uniform diffusion film or on a normal diffusion film;
a condensing lens with a focal length $f_0$ is installed to be adhered to the diffusion film;
one or a plurality of image-forming lenses with a lens pupil diameter $d_1$ at a synthetic focal length $f_1$: $((1/a)+(1/b)=(1/f_1))$ is installed at a distance of approximately $f_0$=a from the condensing lens;
an aerial real image of the first image is formed at a distance of approximately b from a main plane of the image-forming lens with a magnification factor of approximately b/a by the image-forming lens;
a plurality of transparent concave reflectors each with a focal length $f_2$: $((1/b)+(1/c)=(1/f_2))$ and reflectance of about 4% to 50% is stacked at intervals at which the plurality of transparent concave reflectors are able to come into contact with one another by changing angles formed between one another by approximately $\theta_1$: $(\theta_1 \geq (\frac{1}{2})\tan^{-1}(d_1/b))$ near the aerial image having a size of approximately (b/a) $d_0$;
an aerial image of a lens pupil of the image-forming lens with a size $(c/b)d_1$, which has a magnification factor of approximately c/b, is formed at a distance of approximately c in a direction of a main reflection ray of each of the transparent concave reflectors; and
an infinite pentagonal viewing area is formed when $(c/b)d_1 \geq (b/a)d_0$ in front of and behind the aerial image of the lens pupil and a diamond-shaped viewing area is formed when $(c/b)d_1 < (b/a)d_0$ in front of and behind the aerial image of the lens pupil.

2. An image display apparatus, wherein:
a projection image of a projector is formed as a first image of size $d_0$ on an angularly uniform diffusion film or on a normal diffusion film;
a condensing lens with a focal length $f_0$ is installed to be adhered to the diffusion film;
one or a plurality of image-forming lenses with a lens pupil diameter $d_1$ at a synthetic focal length $f_1$: $((1/a)+(1/b)=(1/f_1))$ is installed at a distance of approximately $f_0$=a from the condensing lens;
an aerial real image of the first image is formed at a distance of approximately b from a main plane of the image-forming lens with a magnification factor of approximately b/a by the image-forming lens;
a plurality of transparent concave reflectors each with a focal length $f_2$: $((1/c)+(1/d)=(1/f_2))$ and reflectance of about 4% to 50% is stacked at intervals at which the plurality of transparent concave reflectors are able to come into contact with one another by changing angles formed between one another by approximately $\theta_1$: $(\theta_1 \geq (\frac{1}{2})\tan^{-1}(d_1/b+c))$ at a distance of approximately c: $(c \leq f_2)$ from the aerial image having a size of approximately $(b/a)d_0$;
a virtual image of the first image in a size $(bd/ac)d_0$ with a magnification factor bd/ac is formed at a distance of approximately d in the back direction of each of the transparent concave reflectors;
an aerial image of a lens pupil of the image-forming lens in a size $(e/(b+c))d_1$, which has a magnification factor of approximately e/(b+c), is formed at a distance of approximately e in a direction of a main reflection ray of each of the transparent concave reflectors; and an infinite pentagonal viewing area is formed when $(e/(b+c))d_1 \geq (bd/ac)d_0$ in front of and behind the aerial image of the lens pupil and a diamond-shaped viewing area is formed when $(e/(b+c))d_1 < (bd/ac)d_0$ in front of and behind the aerial image of the lens pupil.

3. An image display apparatus, comprising:

a projection unit configured to project an image; and a plurality of concave reflectors in which contact surfaces with optical axes of the concave reflectors with respect to the optical axis of the projection unit are disposed at different angles from one another, wherein:

a first concave reflector of the plurality of concave reflectors reflects at least a portion of an image projected by the projection unit to form a first image based on the image; and a second concave reflector of the plurality of concave reflectors transmits a portion of an image projected by the projection unit and reflects a portion of the image to form a second image based on the image.

4. The image display apparatus according to claim 3, wherein:

the projection unit includes an image-forming lens configured to form the image;

any one of the first concave reflector, the second concave reflector, and a position between the first concave reflector and the second concave reflector is disposed at a position of a real image formed by the image-forming lens;

the first image is formed on the basis of one of a real image, a virtual image, and an aerial image formed by the first concave reflector;

the second image is formed on the basis of one of a real image, a virtual image, and an aerial image formed by the second concave reflector; and a type of one of the real image, the virtual image, and the aerial image formed by the second concave reflector is different from a type of one of the real image, the virtual image, and the aerial image formed by the first concave reflector.

5. The image display apparatus according to claim 3, wherein:

the projection unit includes an image-forming lens configured to form the image;

the second concave reflector is disposed such that a distance from the image-forming lens is larger than a distance from a real image formed by the image-forming lens;

the first image is an image based on a virtual image; and the second image is an image based on a virtual image.

6. The image display apparatus according to claim 4, wherein a diffusion angle of each of the first image and the second image is within an angle calculated on the basis of a distance from an aerial image corresponding to each of the plurality of concave reflectors.

7. The image display apparatus according to claim 4, wherein:

the projection unit includes a diffusion film configured to diffuse rays from the projected image and a condensing lens configured to condense the rays diffused by the diffusion film;

the image-forming lens forms an image of rays condensed by the condensing lens;

a size of an image projected by the projection unit is $d_0$;

a lens pupil diameter of the image-forming lens is $d_1$;

a distance between the condensing lens and the image-forming lens is a;

a distance in the optical axis direction between the image-forming lens and the second concave reflector is b;

the focal length $f_1$ of the image-forming lens satisfies the relational expression $\{(1/a)+(1/b)=(1/f_1)\}$;

the first image and the second image are formed at a distance c from the real image in the optical axis direction;

a focal length $f_2$ of each of the first concave reflector and the second concave reflector satisfies the relational expression $\{(1/b)+(1/c)=(1/f_2)\}$; and a size of each of the first image and the second image is $(c/b)d_1$.

8. The image display apparatus according to claim 7, wherein an angle $\theta_1$ between a contact surface with the optical axis of the first concave reflector and a contact surface with the optical axis of the second concave reflector satisfies the relational expression $\{|\theta_1| \geq (\frac{1}{2}) \tan^{-1}(d_1/b)\}$.

9. The image display apparatus according to claim 5, wherein an infinite pentagonal viewing area is formed when $\{(c/b)d_1 \geq (b/a)d_0\}$ and a hexagonal viewing area is formed when $\{(c/b)d_1 < (b/a)d_0\}$ in front of and behind the first image and the second image.

10. The image display apparatus according to claim 5, wherein:

the projection unit includes a diffusion film configured to diffuse rays from the projected image and a condensing lens configured to condense the rays diffused by the diffusion film;

the image-forming lens forms an image of rays condensed by the condensing lens;

a lens pupil diameter of the condensing lens is $d_0$;

a lens pupil diameter of the image-forming lens is $d_1$;

a distance between the condensing lens and the image-forming lens is a;

a distance in the optical axis direction between the image-forming lens and a real image formed by the image-forming lens is b;

a distance in the optical axis direction between any one of the plurality of concave reflectors and the real image or a distance in the optical axis direction between a position between the plurality of concave reflectors and the real image is e;

the focal length $f_1$ of the image-forming lens satisfies the relational expression $\{(1/a)+(1/b)=(1/f_1)\}$, the first image and the second image are formed at a distance h from any one of the plurality of concave reflectors or a distance h from a position between the plurality of concave reflectors in traveling directions of reflected rays from the first concave reflector and the second concave reflector, respectively;

a distance between a virtual image due to the second concave reflector and the second concave reflector is g;

a focal length $f_2$ of each of the first concave reflector and the second concave reflector satisfies the relational expression $[\{(1/e)-(1/g)\}=(1/f_2)]$ and satisfies the relational expression $[\{1/(b+e)\}+(1/h)=(1/f_2)]$; and a size of each of the first image and the second image is $\{h/(b+e)\}d_1$.

11. The image display apparatus according to claim 10, wherein an angle $\theta_1$ between a contact surface with the optical axis of the first concave reflector and a contact surface with the optical axis of the second concave reflector satisfies the relational expression $\{|\theta_1| \geq (\frac{1}{2}) \tan^{-1}(d_1/(b+e))\}$.

12. The image display apparatus according to claim 10, wherein an infinite pentagonal viewing area is formed when $\{h/(b+e)\}d_1 \geq \{(bg/ae)d_0\}$ and a hexagonal viewing area is formed when $\{h/(b+e)\}d_1 < \{(bg/ae)d_0\}$ in front of and behind the first image and the second image.

13. The image display apparatus according to claim 3, wherein:
the number of the plurality of concave reflectors are three or more; a third concave reflector of the plurality of concave reflectors is disposed between the projection unit and the first concave reflector and reflects a portion of an image projected by the projection unit to form a third aerial image based on the image; and
the second concave reflector is disposed between the first concave reflector and the third concave reflector.

14. The image display apparatus according to claim 3, wherein:
the number of the plurality of concave reflectors are three or more;
a third concave reflector of the plurality of concave reflectors is disposed between the projection unit and the first concave reflector and reflects a portion of an image projected by the projection unit to form a third aerial image based on the image;
the second concave reflector is disposed between the first concave reflector and the third concave reflector; and
a first difference between a first angle of a contact surface with the optical axis of the first concave reflector with respect to a line perpendicular to the optical axis and a second angle of a contact surface with the optical axis of the second concave reflector with respect to a line perpendicular to the optical axis is different from a second difference between the second angle and a third angle of a contact surface with the optical axis of the third concave reflector with respect to a line perpendicular to the optical axis.

15. The image display apparatus according to claim 3, wherein the focal lengths of the plurality of concave reflectors have the same value, $f_2$.

16. The image display apparatus according to claim 3, wherein the focal lengths of the plurality of concave reflectors have different values from one another.

17. The image display apparatus according to claim 3, wherein at least one of a moth-eye structure film and an anti-reflection (AR) coating for preventing reflection is provided at a surface or a back surface of the plurality of concave reflectors.

18. The image display apparatus according to claim 3, wherein a back surface of the first concave reflector is black.

19. The image display apparatus according to claim 3, wherein the projection unit includes at least one of a projector or a combination of a liquid crystal panel and a lens.

* * * * *